United States Patent [19]
Poulin

[11] Patent Number: 5,809,631
[45] Date of Patent: Sep. 22, 1998

[54] MULTIPLE-AXIS MACHINING APPARATUS

[76] Inventor: Jean-Paul Poulin, 1052 Cornelius Ave., Niskayuna, N.Y. 12309

[21] Appl. No.: 644,237

[22] Filed: May 10, 1996

Related U.S. Application Data

[63] Continuation-in-part of Ser. No. 359,273, Dec. 19, 1994, Pat. No. 5,647,707.
[51] Int. Cl.⁶ .............................. B23Q 23/00; B27F 5/00; B27C 5/00
[52] U.S. Cl. ..................... 29/560; 144/35.1; 144/286.1; 409/190; 409/203
[58] Field of Search .................................... 29/560, 33 R; 409/201, 203, 211, 102, 107, 109, 163, 164, 224, 218, 225, 197, 189, 191, 158, 190, 205; 144/253.2, 135.2, 135.3, 286.1, 35.1; 83/902, 574

[56] References Cited

U.S. PATENT DOCUMENTS

| | | | |
|---|---|---|---|
| 2,075,088 | 3/1937 | Damm et al. | 90/58 |
| 2,752,961 | 7/1956 | Melgaard | 144/136 |
| 3,203,314 | 8/1965 | Ried | 90/11 |
| 4,281,694 | 8/1981 | Gorman | 144/134 |
| 4,335,765 | 6/1982 | Murphy | 144/286.1 |
| 4,512,380 | 4/1985 | Schmidt | 144/1 A |
| 4,546,804 | 10/1985 | Haeger | 144/286.1 |
| 4,798,113 | 1/1989 | Viazanko | 83/471.3 |
| 4,817,693 | 4/1989 | Schuler | 144/359 |
| 5,025,841 | 6/1991 | Totten | 144/135.2 |
| 5,063,983 | 11/1991 | Barry | 144/371 |
| 5,139,065 | 8/1992 | Stark | 144/371 |
| 5,191,935 | 3/1993 | McCombie | 144/286 |
| 5,203,389 | 4/1993 | Goodwin | 144/356 |
| 5,219,011 | 6/1993 | Speck | 144/136 |
| 5,299,609 | 4/1994 | Wedler | 144/1 |
| 5,396,937 | 3/1995 | Clausen | 144/135.2 |
| 5,653,273 | 8/1997 | Bach | 29/560 X |

FOREIGN PATENT DOCUMENTS

| | | | |
|---|---|---|---|
| 2015877 | 7/1994 | Russian Federation | 144/35.1 |

*Primary Examiner*—William R. Briggs
*Attorney, Agent, or Firm*—Heslin & Rothenberg, P.C.

[57] ABSTRACT

A multi-axis machining apparatus including structure for positioning a workpiece in a precise and repeatable manner in relation to a tool bit. The multi-axis machining apparatus includes a main table forming a horizontally disposed upper surface and having an opening for mounting a first tool in an inverted position therein and for projecting a first bit upward through the opening and above said upper surface. The horizontal upper surface has coplanar first and second axes intersecting each other in perpendicular relationship and the opening is centered on a vertical third axis, intersecting the first and second axes in perpendicular relationship therewith. A fence structure may be attached or formed integral to the carriage assembly for guiding movements of a workpiece along the upper surface of the main table. A second table assembly is attachable to the underside of the first table. A carriage assembly may be operatively engaged to the main table for moving the carriage assembly in a direction parallel to the second axis. The carriage assembly may include a carriage operatively engaged therein. A second tool having a second bit oriented in a downward position parallel to the third axis may be mounted to the carriage. A positioner assembly permits variable movement of the carriage assembly and fence structure in a direction parallel to the second axis in a precise and repeatable manner. For use in conjunction with the first tool, other table assemblies may be attached to the carriage assembly for performing machining operations on a workpiece.

22 Claims, 21 Drawing Sheets

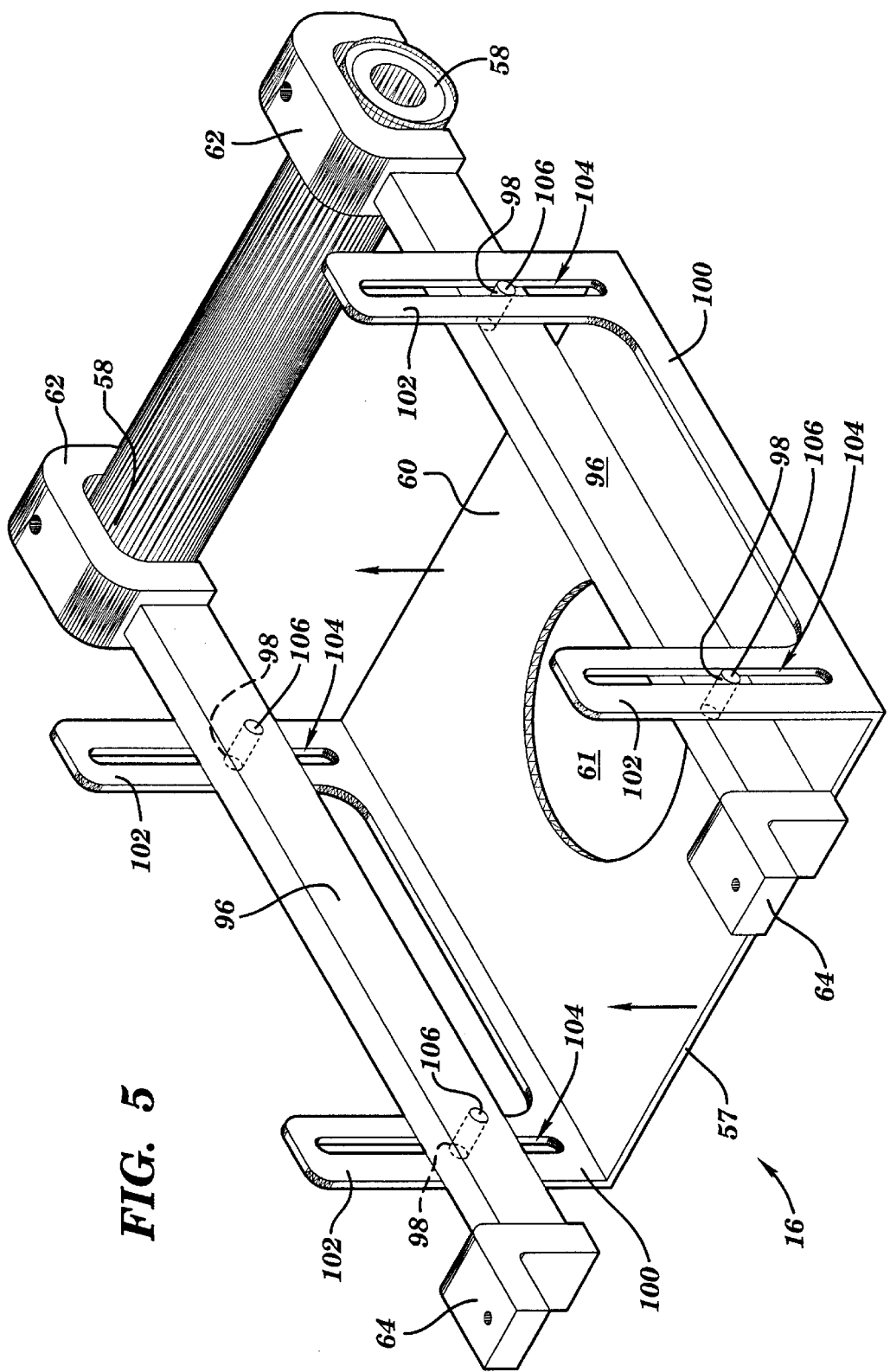

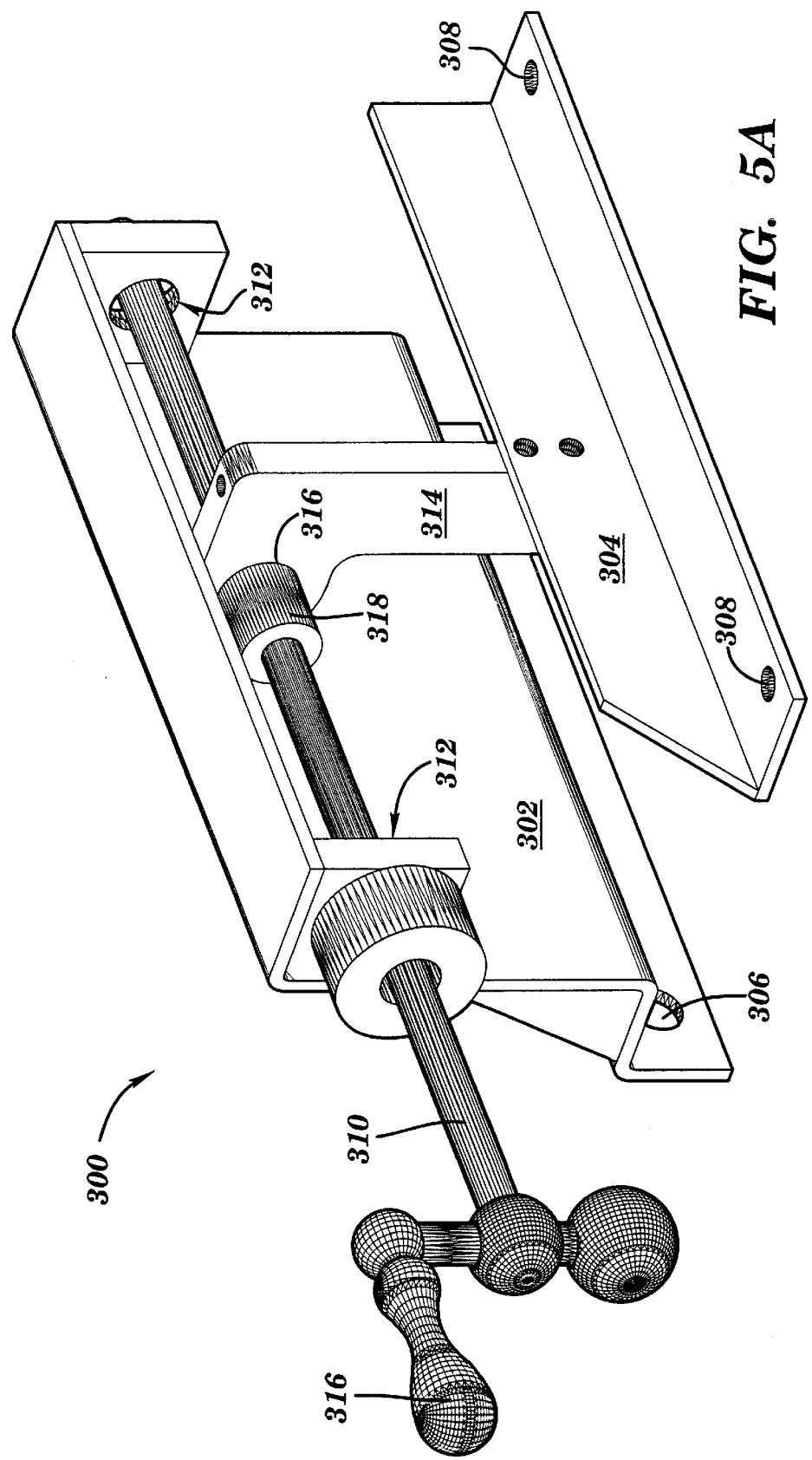

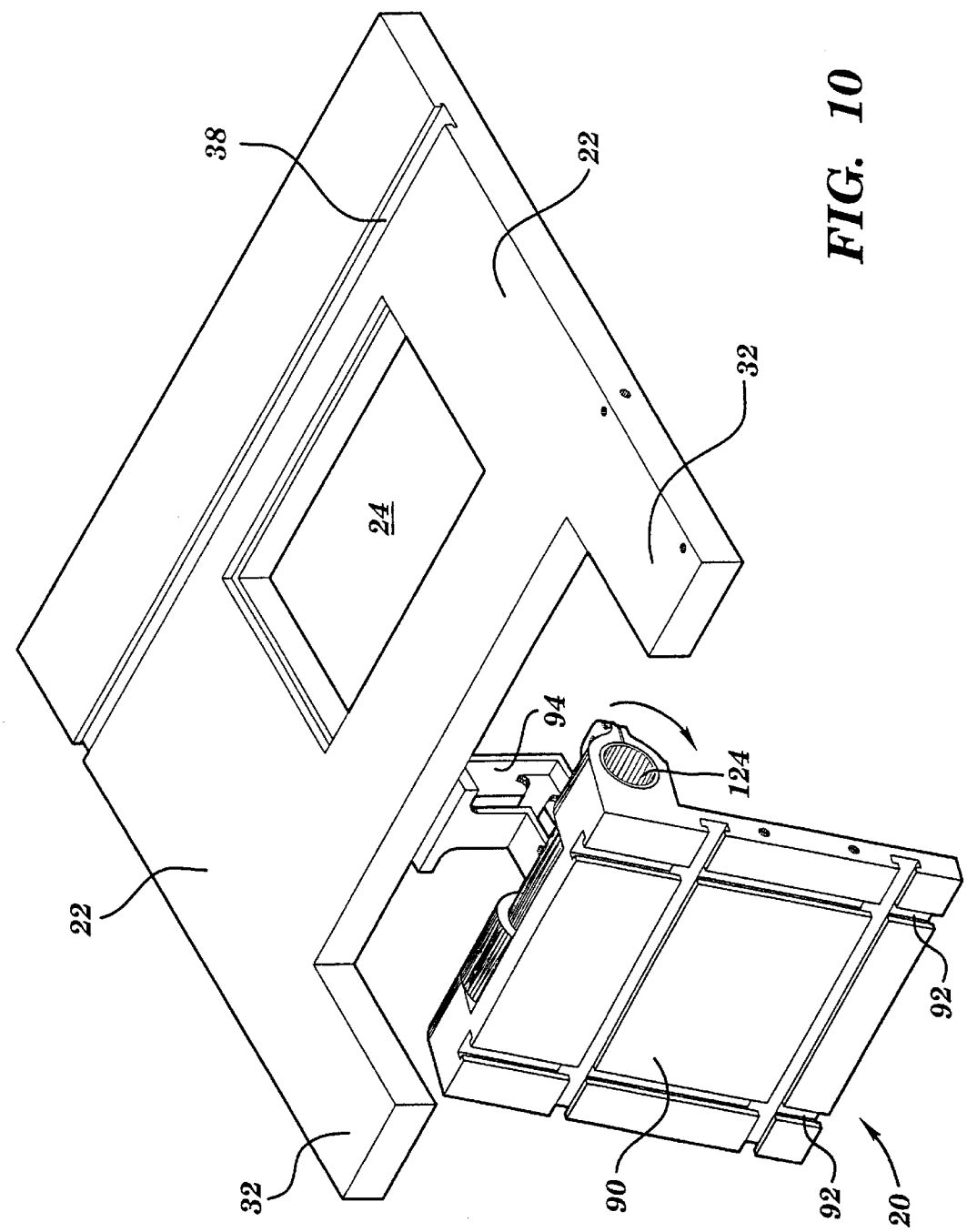

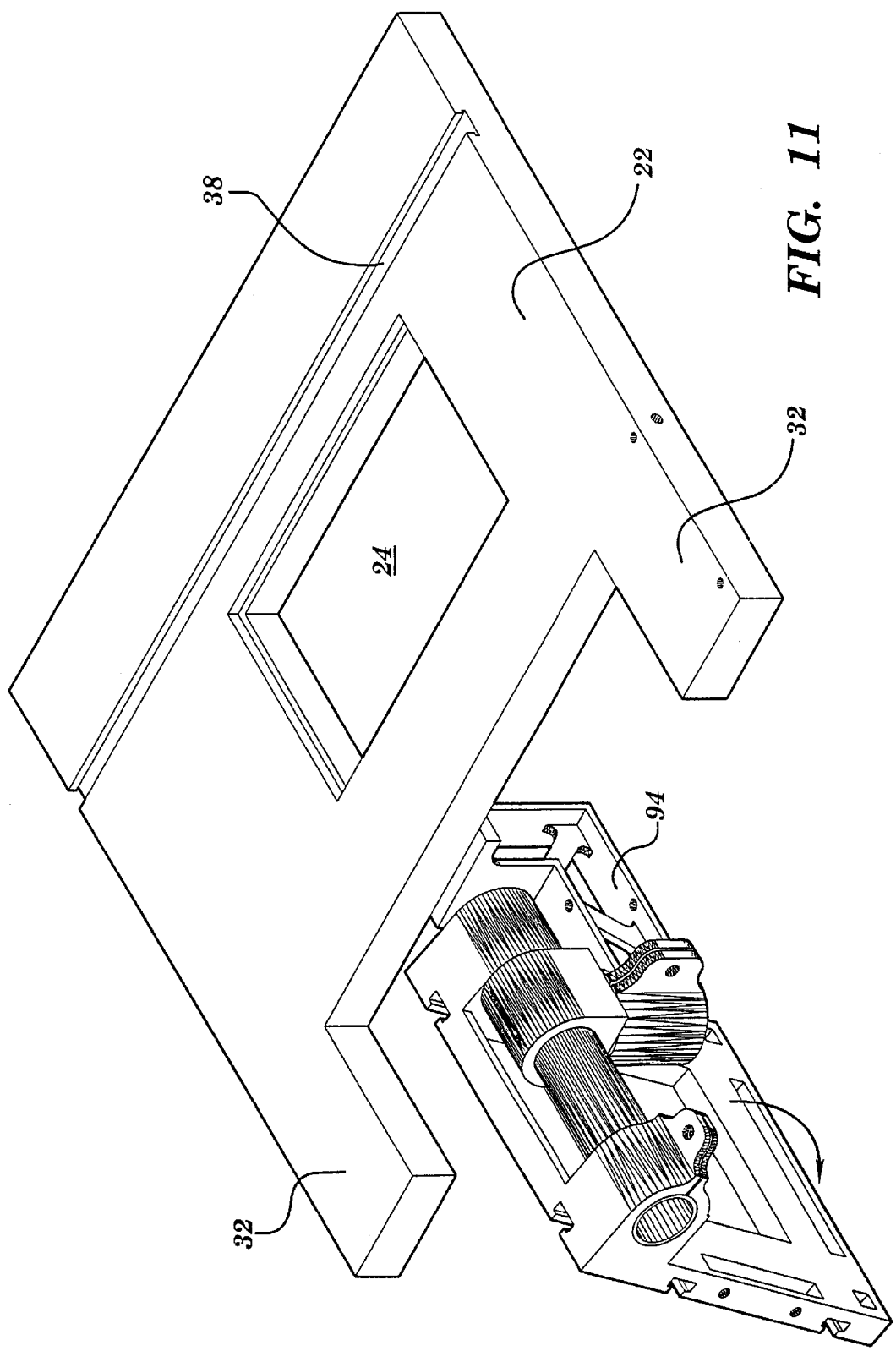

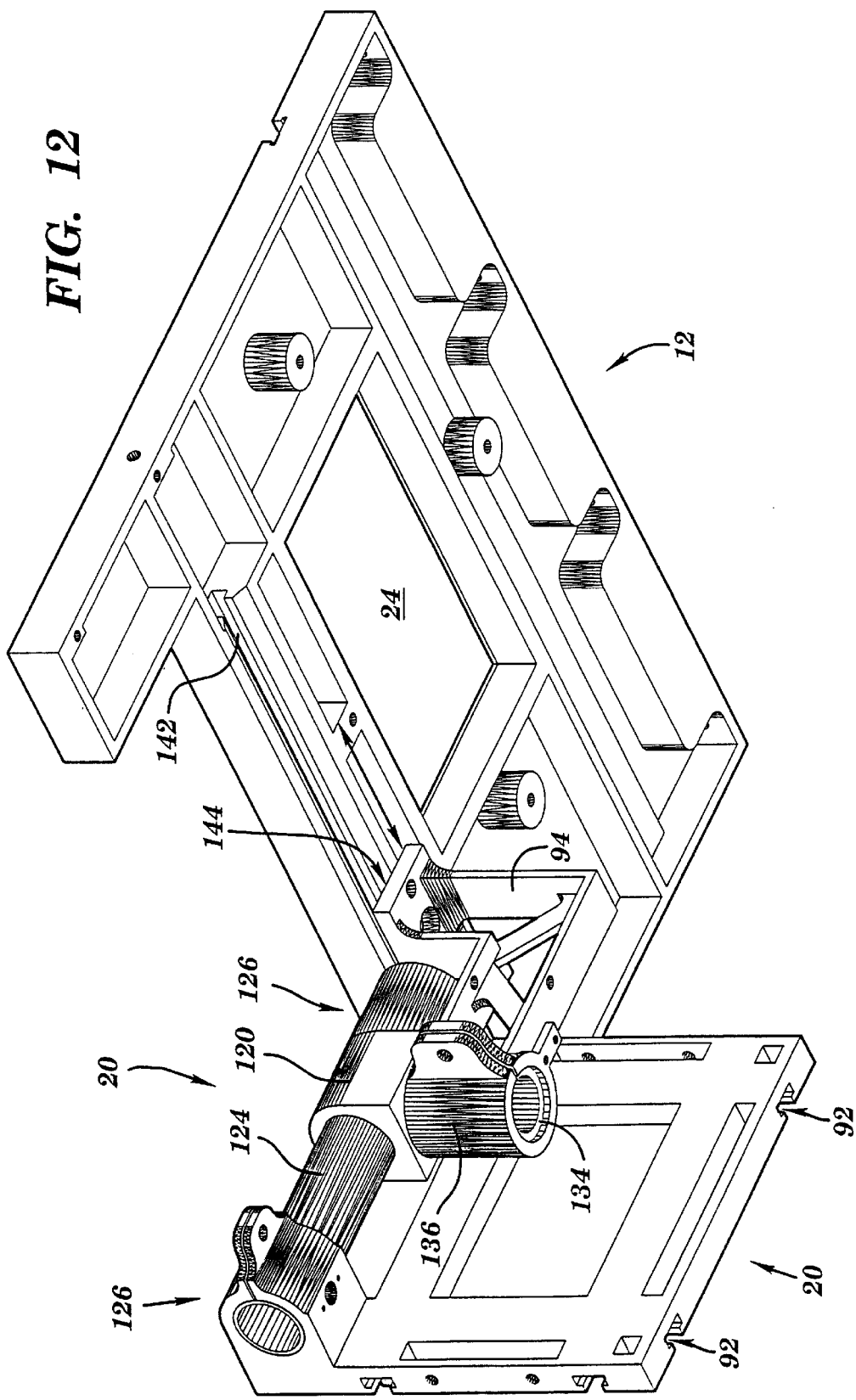

MULTIPLE-AXIS MACHINING APPARATUS

BACKGROUND OF THE INVENTION

Cross-Reference to Related Application

This application is a continuation-in-part of U.S. patent application Ser. No. 359,273 filed on Dec. 19, 1994 U.S. Pat. No. 5,647,707.

TECHNICAL FIELD

The present invention generally relates to machine tools. More particularly, the present invention relates to machine tools such as routers and saws. Even more particularly, the present invention relates to versatile router machining devices and operations.

BACKGROUND INFORMATION

Routers are commonly known and popular tools used for cutting precise edges and groves in workpieces. Virtually any type of joint can be cut partially or completely with a router. For example, routers may be employed for straight-line dadoing, edge-forming, rabbeting, jointing, smoothing edges, mortising, tenoning, grooving, slotting, spline cutting, and shaping irregular edges. Furthermore, router devices may be used to effect virtually an endless array of decorative cuts.

While there are numerous router devices known in the art—many of which include precision guides and advancing mechanisms—for effecting highly precise cuts or grooves to be made in a workpiece, difficulties become apparent when one is faced with making a plurality of identical cuts or grooves precisely spaced relative to each other, in one or more workpieces. In order to achieve the identical cuts or grooves, it is usually necessary to adjust the position of the workpiece or position an additional workpiece in relation to the router bit in an exact and precise manner. However, adjusting the position of a workpiece relative to the cutting tool is a continuing problem, particularly in custom woodworking where high precision calibrated readjustment is often required. Therefore, a significant problem associated with conventional router machining tools is the inability to provide highly precise and repeatable machining operations. Also, the precision of spacing and the often required parallelism of the grooves and cuts may have a pronounced effect on the aesthetics of the finished product.

In addition, while there are numerous router devices that exist today, these devices are limited in their functions and capabilities. Typically, conventional routers require an entire host of jigs and fixtures to perform varied operations. For example, conventional routers typically do not provide adequate flexibility in converting from a decorative tool to a tool having joining capability. Furthermore, when working with medium and large sized workpieces, it is essential that the workpiece is securely fixed in relation to the moving router. While there are numerous devices to assist hand held operations of the router, these devices often yield imprecise machining operations due to the precarious positioning of the router relative to the workpiece. For instance, devices for assisting hand held router operations typically require an attachment to the workpiece and/or router. The operator is then required to manually guide and apply the router to the workpiece in the proper orientation.

Moreover, conventional router devices have limited ability to present a workpiece in a wide range of angles and planes in relation to the tool bit. More particularly, conventional router tools which are employed for making angular cuts in workpieces are usually limited to a fixed angle or to a narrow range of angles relative to the edge of the workpiece. Thus, if grooves must be made, for example, at very acute angles in relation to the edge of a workpiece, these devices may be of no assistance.

Moreover, when face milling a workpiece, typical router tools require that the router be inverted with the bit facing vertically upward. The workpiece is then placed with the side to be milled face down on the machine tool work surface. In order to machine, for example, a pocket-type cut within the face down surface of the workpiece, the machining action is not visible to the operator. As a result, the precise positioning, starting, and stopping of the desired cut is difficult and requires extensive rigging beyond the physical configuration of the typical router tool.

Thus, a need exists for a router machining tool capable of producing a plurality of precisely spaced and repeatable cuts in one or more workpieces. Furthermore, a need exists for a router machining tool capable of performing an entire array of router operations without the need for additional fixtures and jigs. There is also a need for the capability of presenting a workpiece at any angle in relation to a tool bit. Furthermore, there is a need for a machining device which carries the router in the normal bit down orientation, such that the router is securely, adjustably, and positively suspended over a workpiece, allowing for controlled motion of the router in relation to the workpiece. The structure of the present invention contains a solution to the aforementioned problems. As defined below, the present invention provides a significant improvement over currently known machine tools for performing router operations.

SUMMARY OF THE INVENTION

Briefly, the present invention satisfies this need and overcomes the shortcomings of the prior art through the provision of a multiple-axis machining apparatus, which includes a first table forming a horizontally disposed upper surface and having an opening for mounting a first tool in an inverted position therein and for projecting a first bit upward through said opening and above said upper surface. The horizontal upper surface has first and second axes intersecting each other in perpendicular relationship and the opening is centered on a vertical third axis, intersecting the first and second axes in perpendicular relationship. A fence assembly may guide movements of a workpiece along the upper surface of the first table. A second table assembly may be removably attached to the underside of the first table. This second table assembly may be rotated in three dimensions. A carriage assembly may accommodate a second tool and permit movement of the second tool in a direction parallel to the first axis. The second tool may be mounted to the carriage assembly in the upright position with a second bit oriented in a downward position parallel to the third axis. A positioner assembly variably permits movement of the carriage assembly in a direction parallel to the second axis and variably permits movement of the fence assembly in a direction parallel to the second axis in relation to the upper surface of the first table in a precise and repeatable manner.

The carriage assembly includes means for raising and lowering the second tool in a direction parallel to the third axis. This carriage assembly may comprise a pair of horizontally disposed elongated members arranged in parallel spaced relation and extending in a direction parallel to the first axis. Each of the members have first ends opposing second ends, and the first ends may be joined by a first transverse support bar, and the second ends may be joined by a second transverse support bar. The carriage means may include a removable carriage operatively engageable to the guide members.

The removable carriage may include a support plate for mounting the second tool, and engagement means extending from the support plate. The engagement means may be adapted for engaging the elongated members so as to facilitate the slidable movement of the carriage in a direction parallel to the first axis. Preferably, the engagement means include two pairs of extension flanges, wherein each pair is adapted to embrace one of the elongated members.

Typically, the elongated members include a guide rod and a support rod. The guide rod may have two cylindrical guide bushings slidably attached thereto, wherein the two guide bushings are adapted for attachment to two respective extension flanges of the carriage. The support rod is adapted to also support one pair of the extension flanges.

Also, the first table typically includes attachment means for securing an item to the upper surface. The attachment means may comprise one or more elongated T-slots formed on the upper surface of the first table. The T-slots may be used, for example, to attach a miter gauge or a wooden workpiece to the surface of the first table.

The fence assembly includes an elongated fence body. The fence body may be mounted to the ends of the first and second transverse support bars of the carriage means. The fence body is positioned so that a fence surface is perpendicular to the upper surface of the first table. The fence assembly may include an attachment means for attaching accessories.

The second table assembly may include means for moving the second table assembly in a direction parallel to the first axis. In order to facilitate such movement, the second table assembly may have a mounting bracket configured for connection to a slot formed on the underside of the first table. Typically, the second table assembly is used in conjunction with the second tool mounted in the carriage.

A third table assembly may also be employed with the present invention. This third table assembly may be slidably attached to the guide rod and be moveable in a direction parallel to the first axis. The third table assembly may have a work surface which may be positioned in three dimensions. Typically, the third table assembly is used in conjunction with the first tool mounted in the opening of the first table.

It is therefore a primary object of the present invention to enhance the art of woodworking.

It is another object of the present invention to provide a machining device which is capable of effecting a plurality of precisely spaced and repeatable machining operations in one or more workpieces.

It is yet another object of the present invention to provide a machining apparatus which brings greater accuracy and safety to machining operations.

It is another object of the present invention to provide a flexible machining apparatus having the capability of performing virtually an unlimited number of machining operations.

It is still another object of the present invention to provide a multiple-axis machining apparatus which is capable of positioning a workpiece at any desired angle and in any desired plane in relation to a tool bit.

It is another object of the present invention to provide a multiple-axis machining apparatus for use with both heavy duty industrial routers and light duty routers.

It is still another object of the present invention for use with plunge-type routers.

It is another object of the present invention to provide a multiple-axis machining apparatus which is readily and easily convertible from a joining tool to a decorative tool.

It is yet another object of the present invention to provide a highly precise machining device capable of producing a plurality of precisely spaced and repeatable machining operations without the need for attachable fixtures or jigs.

It is still another object of the present invention to provide a machining device which permits highly accurate router operations with the router bit in a face-down position.

BRIEF DESCRIPTION OF THE DRAWINGS

The subject matter which is regarded as the present invention is particularly pointed out and distinctly claimed in the concluding portion of the specification. The invention, however, both as to organization and method of practice, together with the further objects and advantages thereof, may be best understood by reference to the following detailed description taken in conjunction with the accompanying drawings in which:

FIG. 5 is an isometric view of the carriage of FIGS. 1 and 3–4.

FIG. 5A is an isometric view of an X-axis carriage positioner constructed in accordance with the present invention.

FIG. 10 is an isometric view of the second table assembly attached to the underside of the first table showing the second table assembly in one position.

FIG. 11 is an another isometric view of the second table assembly attached to the underside of the first table, showing the second table assembly in a different position from the one shown in FIG. 10.

FIG. 12 is an isometric view from the underside of the first table, showing the means for attaching the first table to the second table assembly.

DETAILED DESCRIPTION

Figure 1:
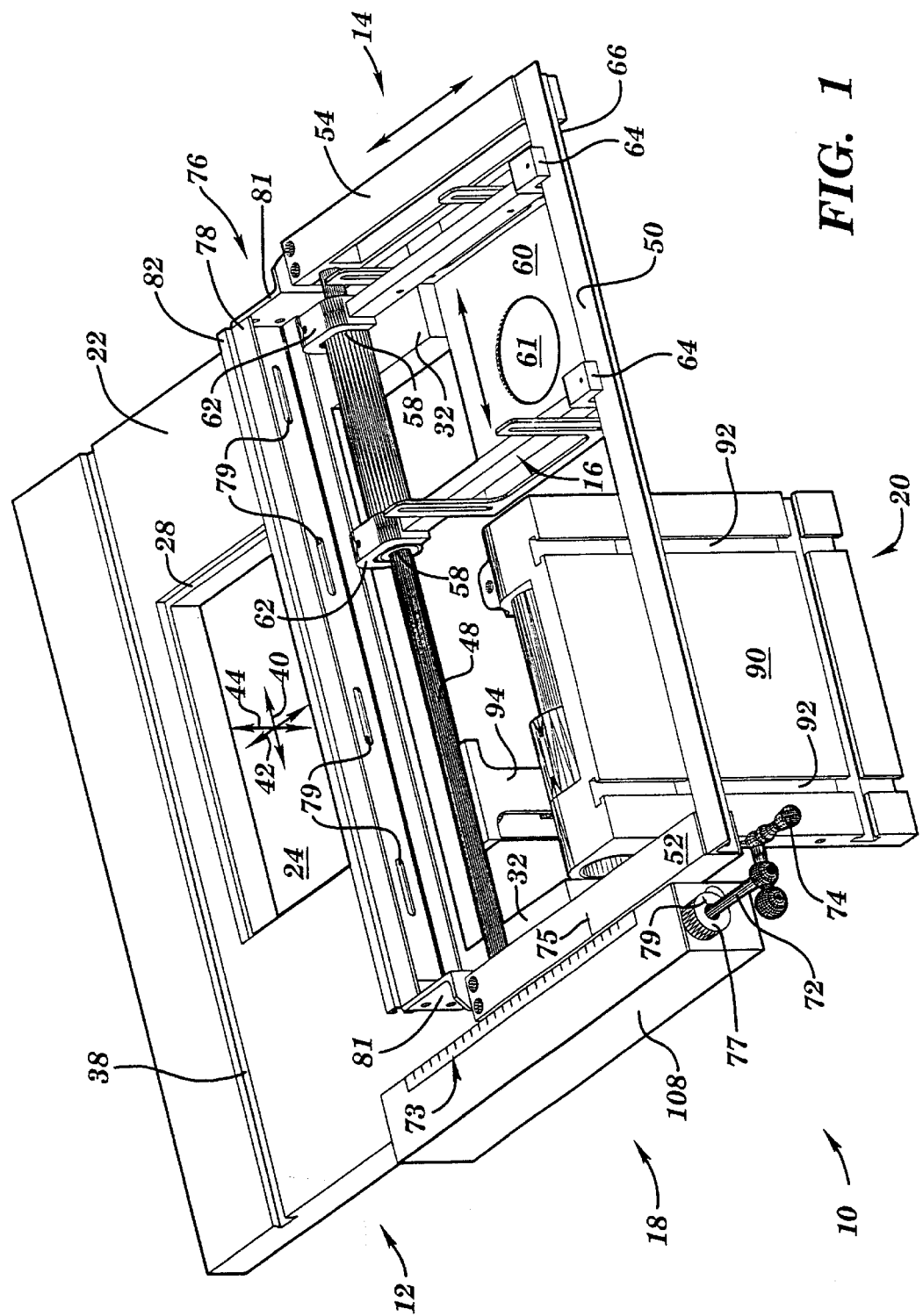
FIG. 1 is an isometric view of a multiple-axis machining apparatus constructed in accordance with the principles of the present invention, including a first table having an opening therein for mounting a router therein, a carriage assembly having a carriage slidably attached thereto, a fence structure attached to the carriage assembly, a positioner assembly for moving the carriage assembly, and a second table assembly mounted to the underside of the first table and positioned below the carriage assembly.

It will be readily apparent that the components of the present invention, as generally described and illustrated in the drawings, could be arranged and designed in a wide variety of different configurations. Thus, the following detailed description of the presently preferred embodiments of the multiple-axis machining apparatus of the present invention, as represented in FIGS. 1–18, is not intended to limit the scope of the invention, as claimed, but is merely representative of the presently preferred embodiments of the invention. The presently preferred embodiments of the invention will be best understood by reference to the drawings, where like parts are designated with like numerals.

In reference to the drawings, and more particularly to FIG. 1, there is shown in accordance with the principles of the present invention, a multiple-axis machining apparatus 10. Multiple-axis machining apparatus 10 includes a main table, e.g., a first machining table 12, a carriage assembly 14 having a carriage 16 engaged thereto, a fence structure 76 for guiding and positioning workpieces along table 12, a positioner assembly 18 for moving carriage assembly 14, and a second machining table 20 positioned below carriage assembly 14 and attached to the underside of first table 12.

First table 12 may form a horizontally disposed planar upper surface 22. As shown in FIG. 1, upper surface 22 has coplanar first and second axes 40, 42 intersecting each other in perpendicular relationship, and a vertical third axis 44 intersecting first and second axes 40 and 42. Throughout this specification, any direction parallel to first-axis 40 shall be designated as the X-direction, any direction parallel to second-axis 42 shall be referred to as the Y-direction, and any direction parallel to third-axis 44 as the Z-direction. It should be noted that when the X-Y-Z directions are referenced throughout this specification, it is meant to include both positive and negative directions.

Opening 24 may be formed in a central location of table 12 for mounting a first tool 26, such as a router 26 therein.

Figure 15:
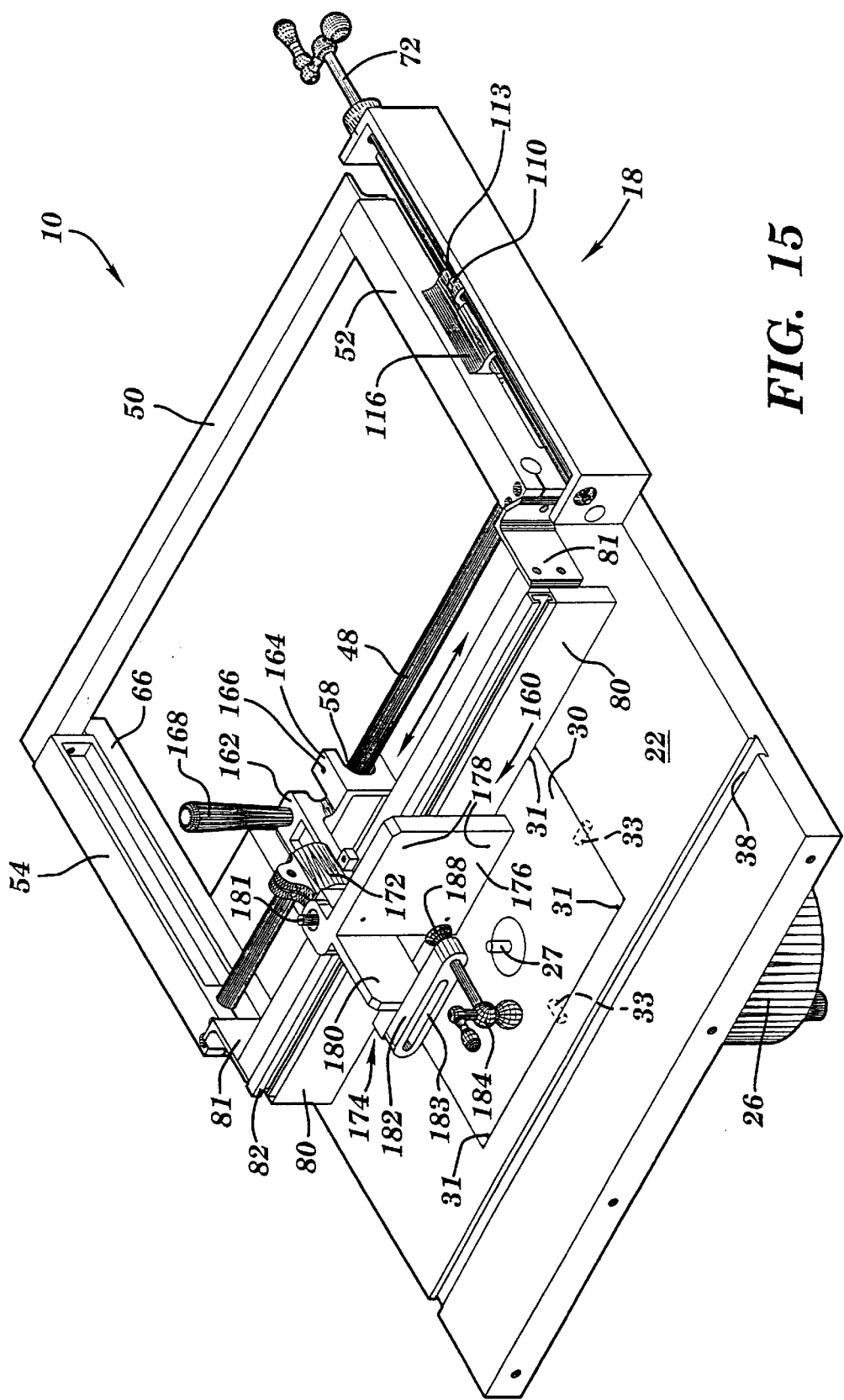
FIG. 15 is an isometric view of the multiple-axis machining apparatus of the present invention, including a third table assembly slidably mounted to the carriage assembly, and a router mounted to the first table in the inverted position.

While opening 24 may take any geometric shape, it is preferred that opening 24 is shaped like a rectangle or square. A rabetted ledge 28 may be formed at the periphery of opening 24 so as to facilitate the alignment and support of a drop-in tool mounting plate 30. As shown in FIG. 15, first router 26 may be attached to tool mounting plate 30 and thereafter inserted into opening 24 in the inverted position so that a router bit 27 faces upward and protrudes above upper surface 22. Once router 26 is dropped into position, the upper surface of mounting plate 30 may be co-planar with the upper surface 22 of table 12. Co-planarity may be achieved by employing mechanical fasteners 31, i.e., screws, in the top four corners of mounting plate 30. Also, mounting plate 30 may be fitted with mechanical fasteners 33 in the edges of mounting plate 30 to facilitate a snug fit in opening 24. Fasteners 33 may thus be threadable parallel to the plane of the upper surface of mounting plate 30 and perpendicular to screws 31. Screws 33 may be adjusted so as to effect a tight fit for plate 30 in opening 24.

Operationally, first router 26 is rigidly stationed in opening 24 so that a workpiece can be passed over or adjacent to the rotating bit 27. Mounting plate 30 may be made of any suitable material, including clear acrylic and phenolic plastic.

In reference back to FIG. 1, table 12 may include one or more T-slots 38 for attaching accessories thereto, such as a miter gauge, adjustable stops, guards and hold-downs. T-slot 38 may also be employed to secure one or more workpieces to table 12. Conventional mechanical means, such as carriage-bolts and wingnuts (not shown), may be used to secure the various accessories to T-slots 38.

Figure 2:
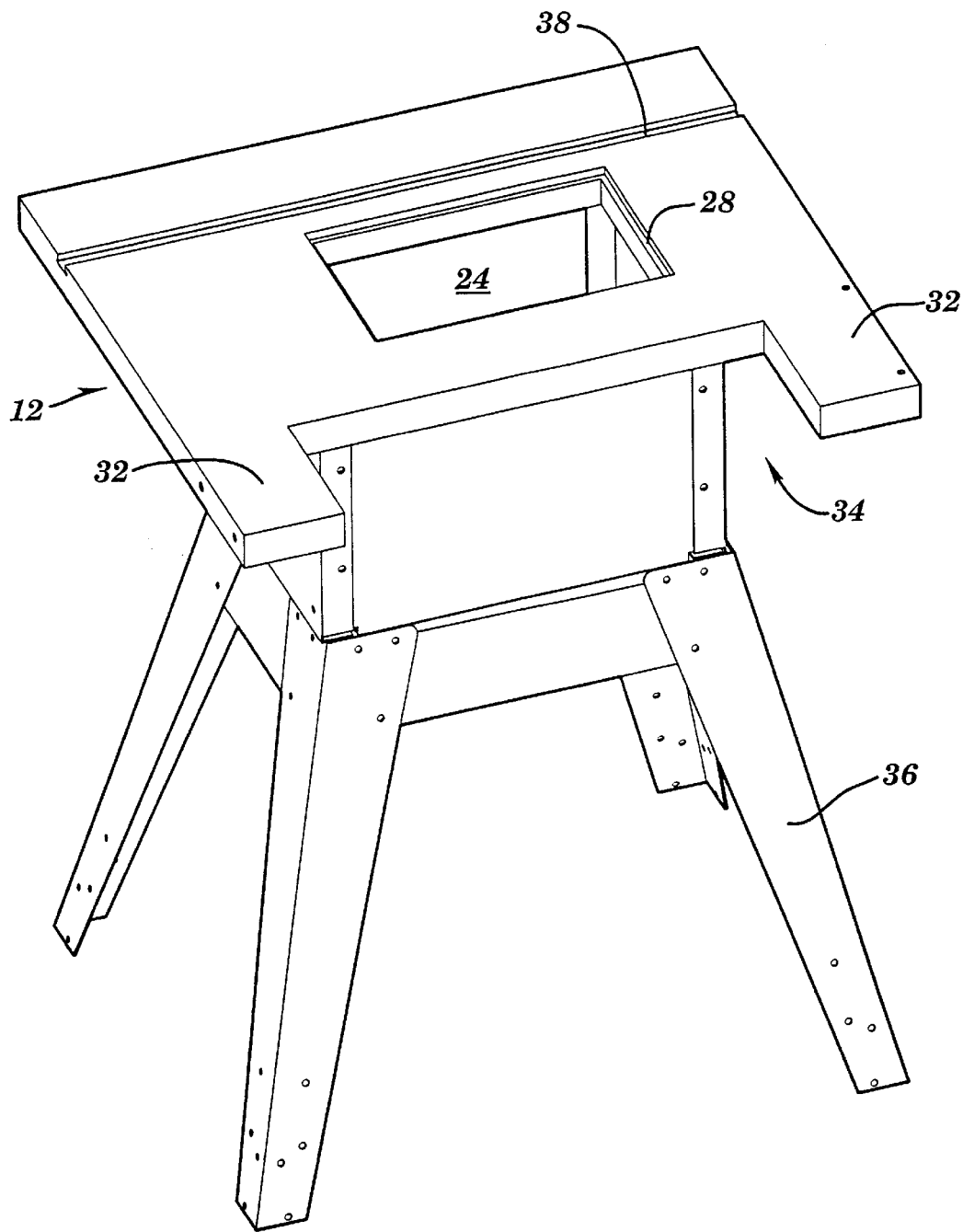
FIG. 2 is a view of the first table of FIG. 1 having legs mounted thereto.

As can be seen in FIG. 2, first table 12 may be shaped so that a pair of wings 32 protrude from one end thereof. This configuration leaves a cut-away region 34 between wings 32. A leg assembly 36 may be attached to the underside of table 12 so that the table can be presented at a desired height, e.g., at counter height.

Table 12 of the present invention is preferably constructed of a structurally strong and durable material. For this reason, table 12 is preferably fabricated of cast iron. Cast iron is preferred because of its ability to withstand the negative influences associated with temperature and humidity changes. Cast iron, for instance, does not warp easily, and possesses excellent damping characteristics. While cast iron is preferred for table 12, other suitable materials may be substituted therefor. For example, solid cast-aluminum, laminate, plastic, and wood are a few examples of alternative materials which may be suitable for table 12. As shown in FIG. 12, the structure of table 12 is preferably formed in a honeycomb configuration to reduce weight while maintaining structural integrity.

Figure 3:
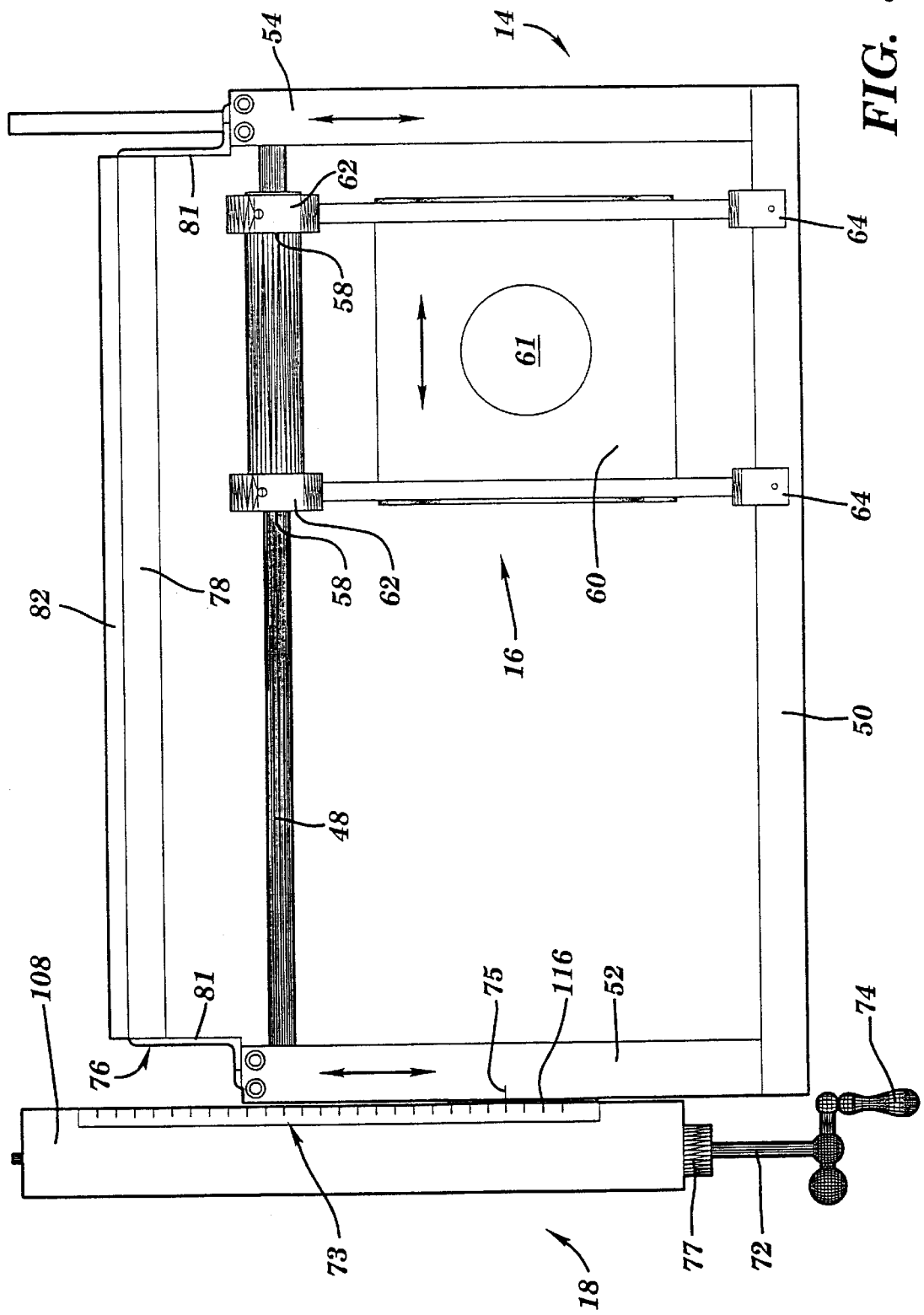
FIG. 3 is a top plane view of the positioner assembly and carriage assembly of FIGS. 1–2.
Figure 4:
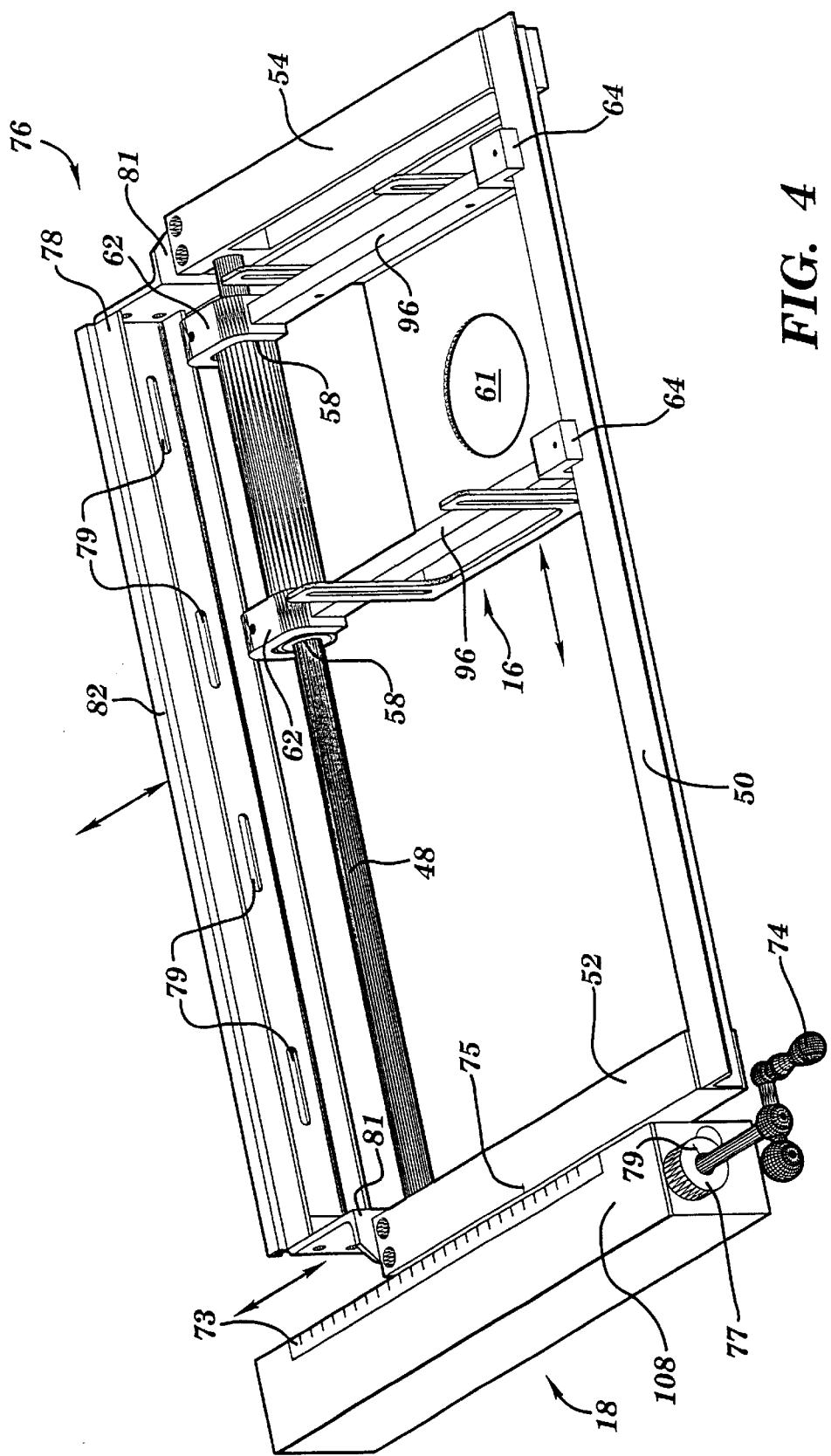
FIG. 4 is an isometric view of the positioner assembly and carriage assembly of FIG. 3.

FIGS. 3 and 4 show carriage assembly 14 of the present invention detached from most of the other components of machining apparatus 10. Positioner assembly 18 lies adjacent to one side of carriage assembly 14. An attachment block 116 may be employed to secure positioner assembly 18 to carriage assembly 14. Carriage assembly 14 provides a means for moving a second tool 46, such as router 46 (see FIGS. 13 and 14), in the X-direction. Carriage assembly 14 includes removable carriage 16 for mounting router 46 in the normal upright position therein such that a bit 47 of second tool 46 can be oriented downward. In addition to providing means for moving second tool 46 in the X-direction, carriage assembly 14 may include means for raising and lowering second tool in the Z-direction, the details of which will be described more fully hereinafter.

Carriage assembly 14 may include a pair of horizontally disposed members, such as guide rod 48 and support rod 50, arranged in parallel spaced relation to one another. A first transverse support rod 52 attaches the first ends of rods 48, 50 and a second transverse support rod 54 attaches second ends of rods 48, 50. As shown in FIG. 3, transverse support rod 52 is adjacent to and attached to positioner assembly 18 through the provision of attachment block 116. Carriage 16 may be secured to rods 48, 50 for engagement, i.e., slidable motion therealong in the X-direction. Carriage 16 may include engagement means for facilitating the slidable engagement of carriage 16 and rods 48, 50.

Guide rod 48 may be cylindrical in shape. One or more guide bushings 58 may be slidably secured to guide rod 48. In the preferred embodiment, two bronze guide bushings 58 are attached to guide rod 48 so as to facilitate movement of carriage 16 in the X-direction. Guide rod 48 is a high precision rod, and is intended to accurately and precisely guide carriage 16 in a plane parallel to the planes formed by first and second axes 40, 42.

Support rod 50 may be angled in cross-section, and as such, may be referred to as an angled support rod. Both rods 48 and 50 are preferably the same length and may be employed in conjunction with one another to facilitate the smooth, non-binding linear X-direction motion of carriage 16.

In reference to FIG. 5, carriage 16 may include a tool support plate 60, and means for engaging carriage 16 to rods 48 and 50. Support plate 60 may include an opening 61 so that a tool bit, i.e., router bit 47 may protrude below the bottom surface of support plate 60 (see FIGS. 13 and 14). Support plate 60 thus accommodates a router 46 in the normal upright position. The engagement means may comprise at least one guide rod extension flange 62 adapted to embrace guide rod 48 and at least one support rod extension flange 64 adaptable to embrace support rod 50. As can be seen best from FIG. 5, there are preferably a total of four extension flanges associated with support plate 60, namely, a pair of extension flanges 62 adaptable to guide rod 48 and a pair of extension flanges 64 adaptable to support rod 50. Each extension flange 62, 64 should be configured for embracing the specific configuration of its respective rod. Therefore, each extension flange 62 may be C-shaped for accommodating cylindrical bushings 58 which are secured to cylindrical guide rod 48. Each extension flange 64, however, may be L-shaped, or angled, having a flat bottom surface formed thereon, to accommodate the shape and the flat upper surface of angled support rod 50.

Each guide rod extension flange 62 may include means for removably securing each guide rod extension flange 62 to its respective bushing 58. For example, conventional mechanical securing means, such as set screws may be employed to removably secure each extension flange 62 to its respective bushing 58. Support rod extension flange 64 may simply rest on the upper surface of support rod 50. During movement of carriage 16 along rods 48, 50 in the X-direction, the bottom surface of extension flanges 64 slide along the upper surface of support rod 50. Preferably, the coefficient of friction between the mating surfaces of extension flanges 64 and support rod 50 is sufficiently low to facilitate a smooth sliding motion therealong. Because carriage assembly 14 preferably utilizes only one high precision guide rod 48 in order to achieve X-direction movement of carriage 16, carriage assembly 14 may be called a single-track guidance assembly.

A precise positioner for moving carriage 16 in the X-direction, i.e., a precise X-axis carriage positioner 300 (see FIG. 5A), may be employed in the multiple axis machining apparatus 10 of the present invention. More particularly, X-axis carriage positioner 300 may be removably attached to carriage assembly 14, via fence structure 76, and to carriage 16 so as to facilitate the precise movement of carriage 16 in the X-direction.

X-axis carriage positioner 300 may include a first member 302 and a second member 304. First member 302 may be removably attached to fence structure 76, while second member 304 may be removably attached to carriage 16. First member 302 may include one or more holes 306 so that conventional mechanical fasteners (not shown) can be employed to attach first member 302 to elongated T-slot 82. X-axis carriage positioner 300 may be manually and variably positioned and secured to fence structure 76 in the X-direction within T-slot 82.

A lead screw 310 may extend alongside first member 302. A bearing assembly 312, attached to first member 302, may be employed to retain lead screw 310 alongside first member 302.

Second member 304 may be removably secured to the top of extension flanges 62. In order to achieve such an attachment, second member 304 may include apertures 308 so that conventional mechanical fastening means, e.g., screws, can be employed to attach X-axis carriage positioner 300 to corresponding threaded holes 63 (see FIG. 5) formed in the top of flanges 62.

Angled arm 314 may include an aperture 316 for accommodating a threaded nut 318 therein. Lead screw 310 may be threaded to nut 318. By turning a handle, e.g., a counterbalance rotating handle 316, attached to one end of lead screw 310, nut 318, angled arm 314, second member 304 and carriage 16 may be precisely and accurately moved in the X-direction. The X-axis carriage positioner 300 may be selectively attached to T-slot 82 of fence structure 78, and thereafter, nut 318 may be advanced for the precise positioning of carriage 16 in the X-direction.

Carriage 16 may include a means for raising and lowering support plate 60 in relation to rods 48 and 50. As described above, there are preferably four extension flanges, namely two guide rod extension flanges 62 and two support rod extension flanges 64. As can be seen best in FIG. 5, each guide rod extension flange 62 may be connected to an associated support rod extension flange 64 by an interconnecting rail 96. Rail 96 may simply be a bar extending between two associated flanges. Once carriage 16 is mounted on guide rod 48 and support rod 50, rails 96 are disposed transverse to rods 48 and 50.

An outer edge 57 may be formed around the periphery of support plate 60. The two sides of outer edge 57 which are positioned transverse to rods 48 and 50 when carriage 16 is attached to rods 48 and 50 may have a wall 100 attached thereto, extending above the upper surface of support plate 60. Wall 100 may be formed integral to support plate 60 or otherwise mechanically fastened thereto. In order to increase the structural rigidity of carriage 16, wall 100 may angle around the corners of support plate 60. Each wall 100 may include a pair of upwardly extending branches 102. Each branch 102 may include a slot 104 centrally bored through the length thereof. Each slot 104 is configured for alignment with a respective hole 98 formed through rail 96. For each rail 96, there preferably are two holes 98. A pin 106 may extend through an aligned hole 98 and slot 104. By utilizing pins 106 and other mechanical fasteners, rails 96 may be securely fastened to each branch 102. Because of the elongated structure of slot 104, each pin 106 may be adjusted vertically in the Z-direction in slot 104. Once support plate 60 is vertically adjusted to a desired height, the pins 106 may be securely fastened to slots 104, support plate 60 may be secured in the desired position.

Figure 14:
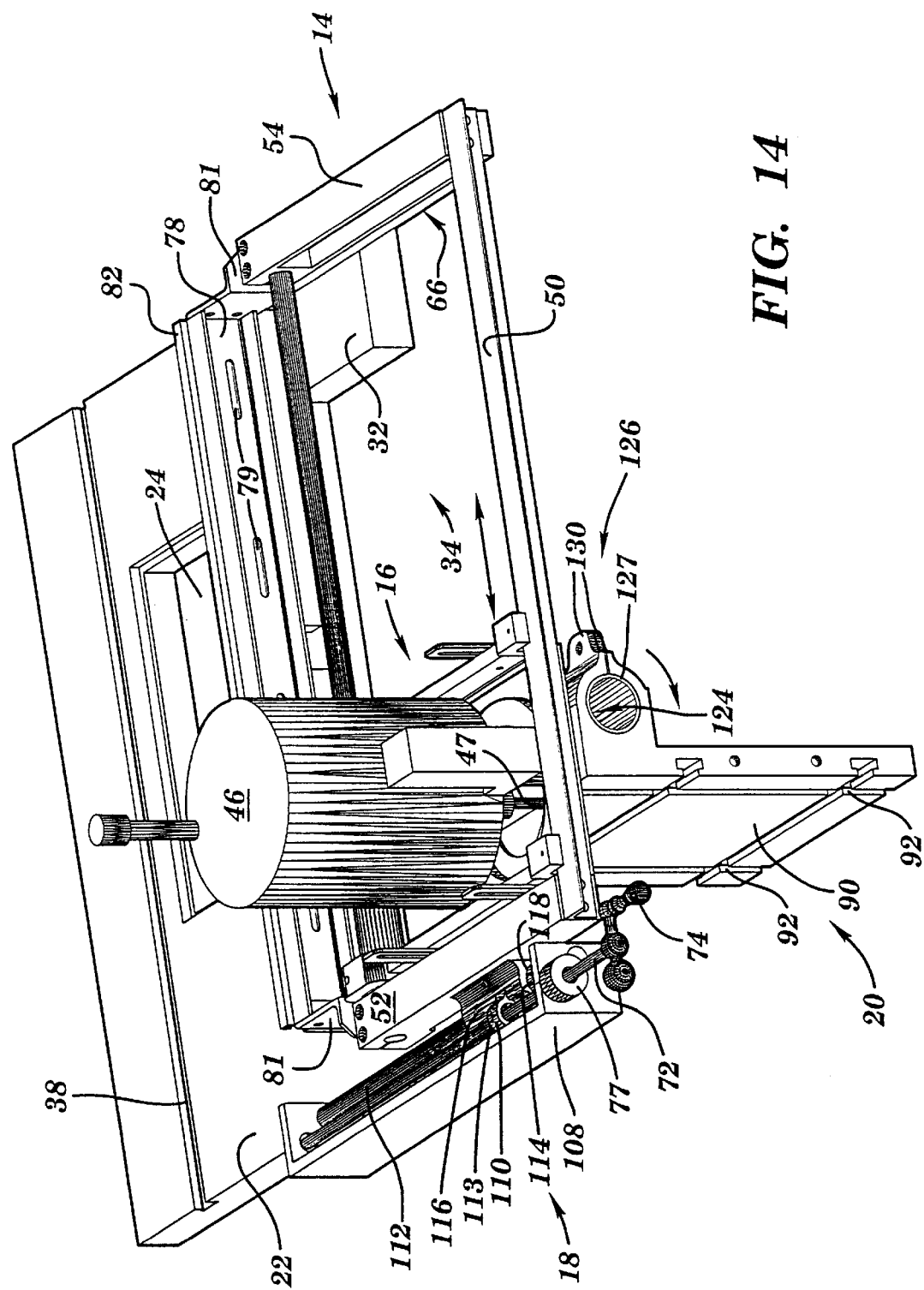
FIG. 14 is an isometric view of the multiple-axis machining apparatus showing the components of the positioner assembly in detail, also showing a router mounted to the carriage in the normal position.

In reference now to FIG. 14, carriage 14 may have router 46 mounted in the upright position therein, where router bit 47 faces vertically downward in the Z-direction, protruding through the opening 61 of support plate 60. By raising and lowering support plate 58, router 46 may be adjustably positioned in the Z-direction for performing numerous machining operations such as mortising. It is intended that both fixed-base and plunge routers be used in conjunction with carriage 16. If a plunge router is used, an even greater vertical displacement of router 46 may be achieved. Therefore, both the router 46 and carriage 14 may be moved vertically to adjust the clearance of the router bit 47 in relation to a workpiece. In conjunction with second table assembly 20, which is disposed in a lower position relative to carriage assembly 14, carriage 14 and attached tool 46 may be used to perform numerous machining operations, as will be more fully described hereinafter.

By utilizing positioner assembly 18 of the present invention, carriage assembly 14 may be variably positioned in a repeatable and precise manner in the Y-direction. As can be seen in FIG. 1, positioner assembly 18 may include a lead screw 72 disposed in a direction parallel to second axis 42. Lead screw 72 is a high precision screw, which enables the apparatus of the present invention to achieve high precision positioning of assembly 14 without binding or backlash. A handwheel 74 may be employed to rotate lead screw 72 for positive and negative movement of carriage assembly 14. The lead screw components of positioner assembly 18 may be housed in a housing 108 which resembles a long rectangular box. Housing 108 is rigidly secured by mechanical or other means to one of the wings 32 of first table 12.

As can be seen in FIG. 14, lead screw 72 may extend through housing 108 and out one end thereof. Hand wheel 74 may be attached to one end of lead screw 72 outside of housing 108. The number of threads selected for lead screw 72 may vary depending on the application intended for apparatus 10. A nut 110 is threadably attached to lead screw 72. A guide rod 112, in spaced parallel relation to lead screw 72, may extend the length of housing 108. Preferably, guide rod 112 is cylindrical in shape. One or more bushings 114 may be slidably attached to guide rod 112.

An attachment block 116 may be employed to interconnect carriage assembly 14 to bushings 114. In order to achieve such a connection, attachment block 116 may be rigidly secured to first transverse support rod 52 of carriage assembly 14. Attachment block 116 may have a cylindrical cavity 118 formed therethrough for accommodating bushings 114 and guide rod 112. The peripheral surfaces of bushings 114 may be secured to the internal wall of cavity 118. In order to translate the rotation of lead screw 72 into Y-direction movement of carriage assembly 14, nut 110 may be rigidly secured to attachment block 116. In order to facilitate attachment of block 116 to nut 110, a cylindrical tubular piece 113 can be formed on block 116 and mechanically secured to nut 110.

Operationally, as an operator turns handwheel 74, lead screw nut 110 may be advanced in the Y-direction. As nut 110 advances, the rigid attachment of nut 110 to attachment block 116 causes carriage assembly 14 to also be advanced. In order to facilitate such movement of carriage assembly 14, second transverse support rod 54 may slide on the upper surface of guide track 66. Guide track 66 can be rigidly secured to one of the wings 32 of first table 12.

In the preferred embodiment, lead screw 72 comprises an ACME lead screw with an anti-backlash ACME nut assembly. Lead screw 72 may have 16 threads per inch. If such a lead screw is selected, a quarter turn of handwheel 74 would displace carriage 14 a distance of $\frac{1}{64}$th of an inch. With such a lead screw, a positioning accuracy and repeatability of less than 0.005 inches may be achieved.

As shown in FIG. 1, positioner assembly 18 may include a measuring scale 73 on the top of housing 108. Scale 73 may include, for example, gradations of $\frac{1}{16}$th of an inch and can be used as a coarse scale for determining Y-direction movement of carriage assembly 14. A fixed indicator point 75 may be placed on first transverse support rod 52. In addition to scale 73, a dial measuring scale 77 may be positioned on the face of housing 108 where lead screw 72 exits therefrom. Dial measuring scale 77 may be circular in cross-section, having its center aligned with lead screw 72. Preferably, scale 77 is divided into eight forty-five degree segments. An indicator point 79 is attached to lead screw 72, facing radially outward. By rotating handle 74 one-eighth of a turn, carriage assembly 14 may be advanced $\frac{1}{128}$ of an inch. Furthermore, by rotating handle one-half of a turn, carriage assembly 14 may be advanced a distance of $\frac{1}{32}$ of an inch. While scale 77 is preferably divided into eight forty-five degree segments, it should be understood that different degree segments may be employed therefor.

Figure 6:
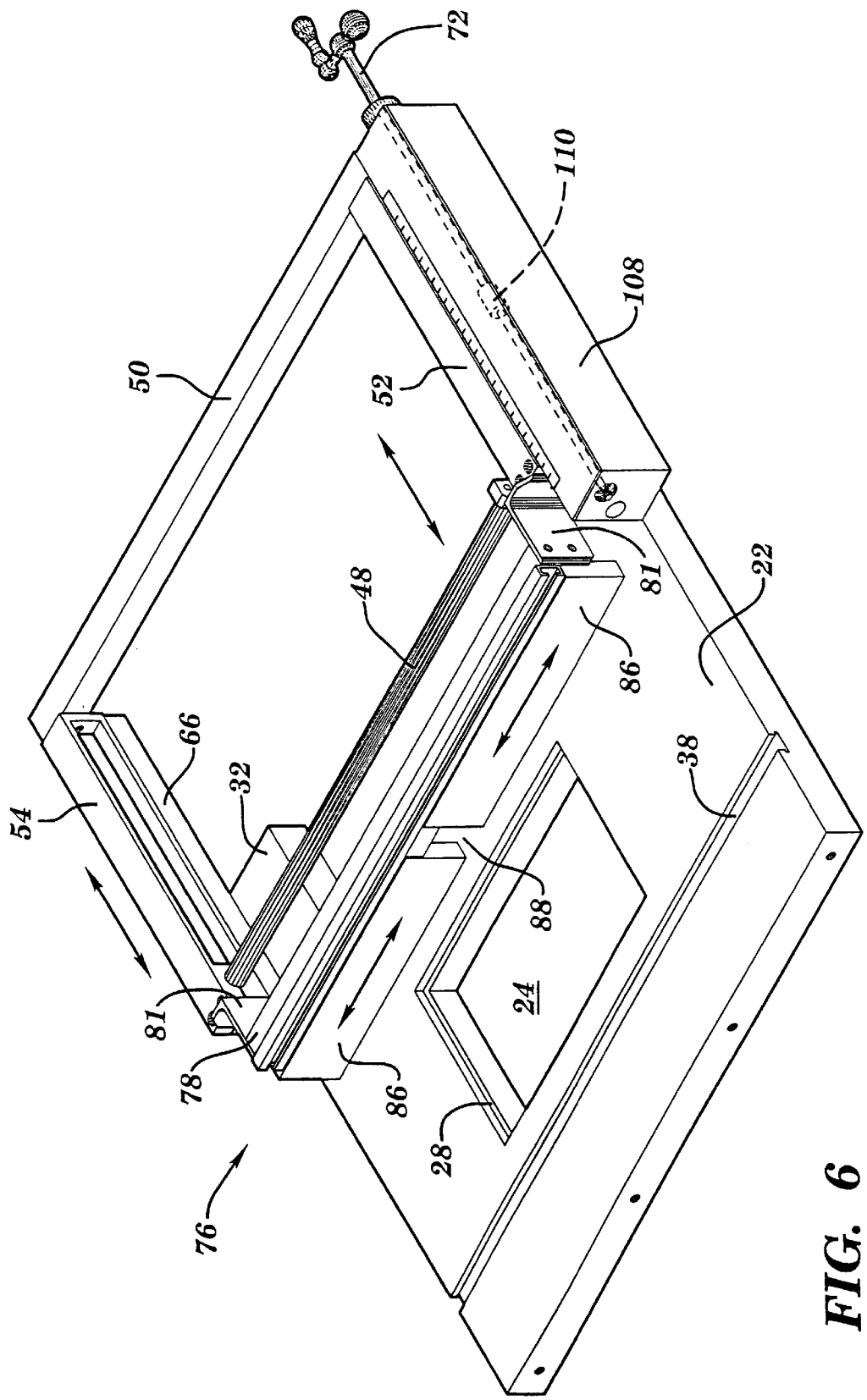
FIG. 6 is an isometric view showing the first table, a guide fence assembly, the carriage assembly, and the positioner assembly.
Figure 7:
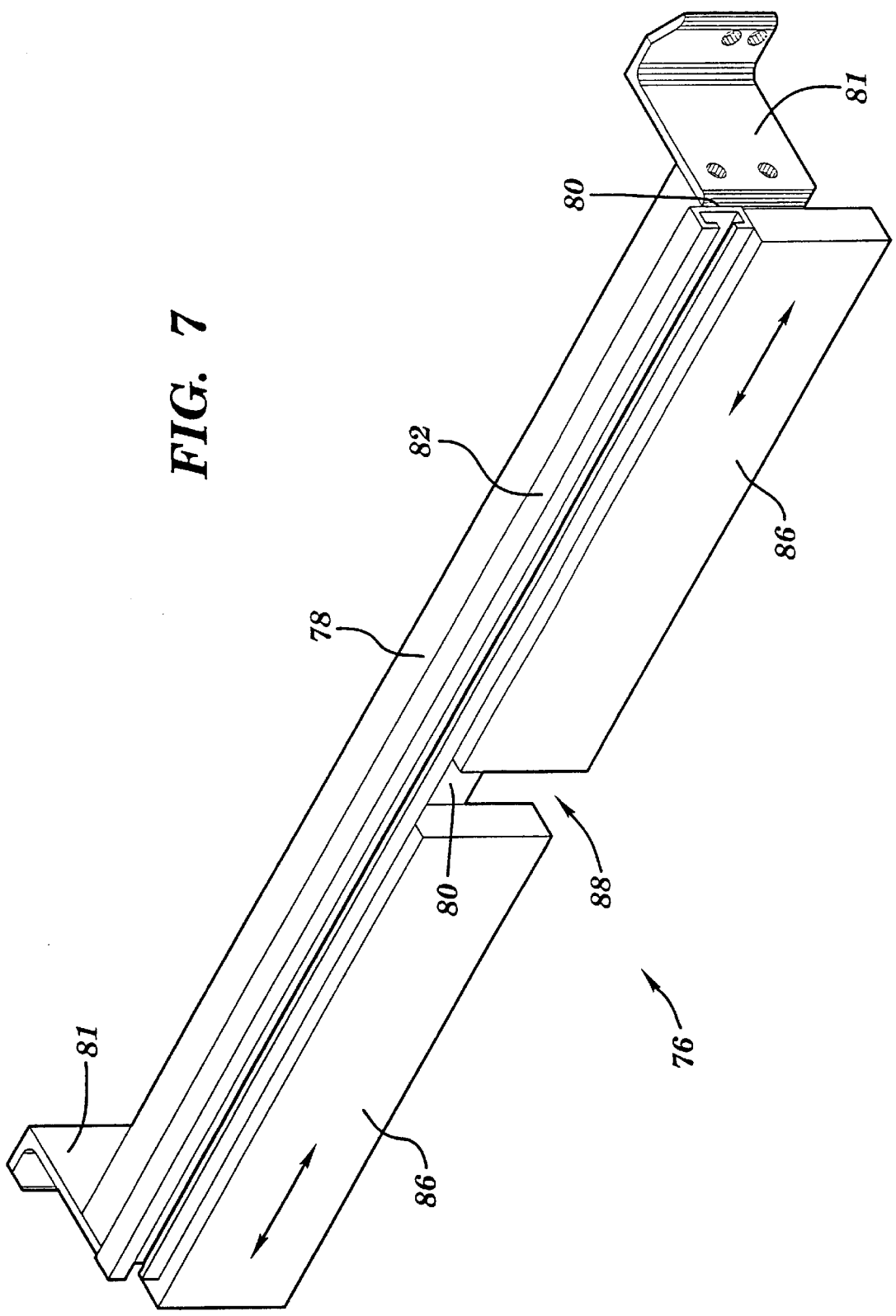
FIG. 7 is an isometric view of the guide fence assembly of the present invention shown detached from the other components of the multiple-axis machining apparatus.

As can be seen best in FIGS. 6 and 7, a fence structure 76 may be removably attached or formed integral to carriage assembly 14 for guiding movements of a workpiece or a plurality of workpieces along upper surface 22 of first table 12 and for positioning a workpiece in relation to first bit 27 of first tool 26. By attaching fence structure 76 or being formed integral to carriage assembly 14 and employing positioner assembly 18, the fence structure can be precisely and repeatably positioned along upper surface 22 in the Y-direction. Fence structure 76 may comprise an elongated fence body 78 removably mounted to the ends of first transverse bar 52 and second transverse bar 54. Two angled end pieces 81 may be employed to attach fence body 78 to transverse support bars 52 and 54. Fence body 78 may include a flat surface 80 disposed perpendicular to the upper surface 22 of first table 12.

Fence structure 76 can include a means 82 for attaching one or more accessories thereto. This attachment means 82 may comprise an elongated T-slot 82 mounted to the upper portion of surface 80. Preferably, elongated T-slot 82 covers only a small area of surface 80, extending across the top portion thereof. T-slot 82 may be used to mount various accessories, e.g., clamp downs. The remaining area of fence surface 80 can then accommodate one or more blocks 86 which the workpiece may be held against during various machining operations. As shown in FIG. 1, a plurality of horizontally disposed slots 79 may be formed through elongated body 78. In conjunction with mechanical fasteners, slots 79 may be used to securely fasten blocks 86 to surface 80.

Blocks 86 should be comfortably placed against surface 80. Preferably, two blocks 86 are positioned against surface 80 so as to form a changeable void 88 between the inside ends of the blocks. As the positioned assembly 18 advances fence structure 76 in a direction towards router 26, router bit 27 may be positioned within void 88 and therefore surrounded by the ends of the pair of blocks 86. If desired, the ends of the pair of blocks 86 may lie adjacent to one another so that void 88 is non-existent. Typically, blocks 86 may comprise wooden pieces of wood. Other blocks, however, fabricated from a wide variety of materials, may be substituted therefor.

Figure 13:
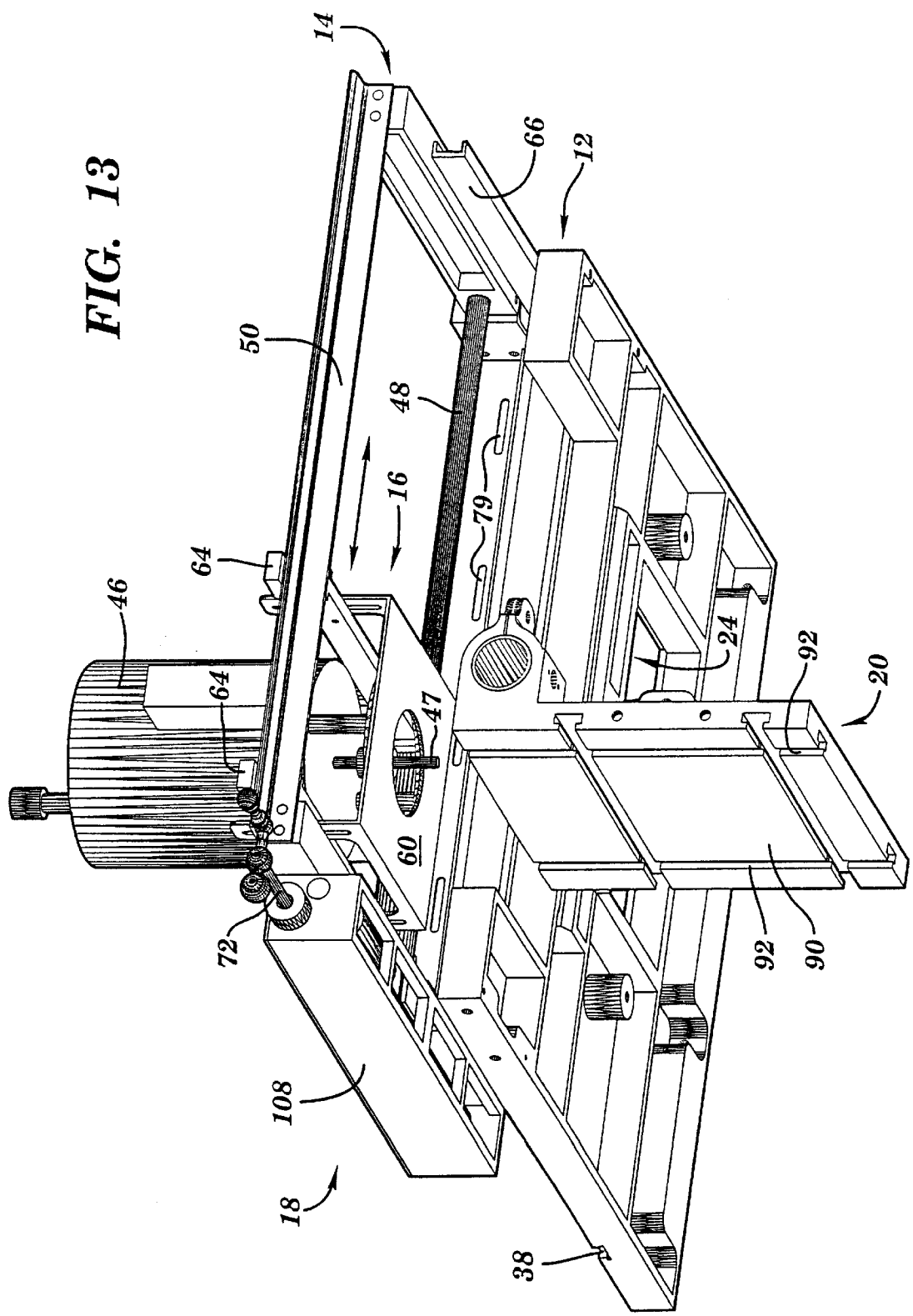
FIG. 13 is an isometric view from the underside of the first table, showing a router positioned in the carriage assembly, and a relationship of the router bit and the second table assembly.

As can be seen best in FIGS. 1, 12 and 13, second table assembly 20 may be removably attached to the underside of first table 12. Second table assembly 20 is positioned in a lower position relative to carriage assembly 14, i.e., below carriage assembly 14, so that machining operations may be performed by tool 46 on a workpiece mounted to a work surface, i.e., table 90 of second table assembly 20. Preferably, the work surface is flat and may include one or more attachment means, such as T-slots 92. Like T-slots 38 of first table 12, T-slots 92 of second table assembly 20 may be employed to secure accessories and workpieces thereto.

Figure 8:
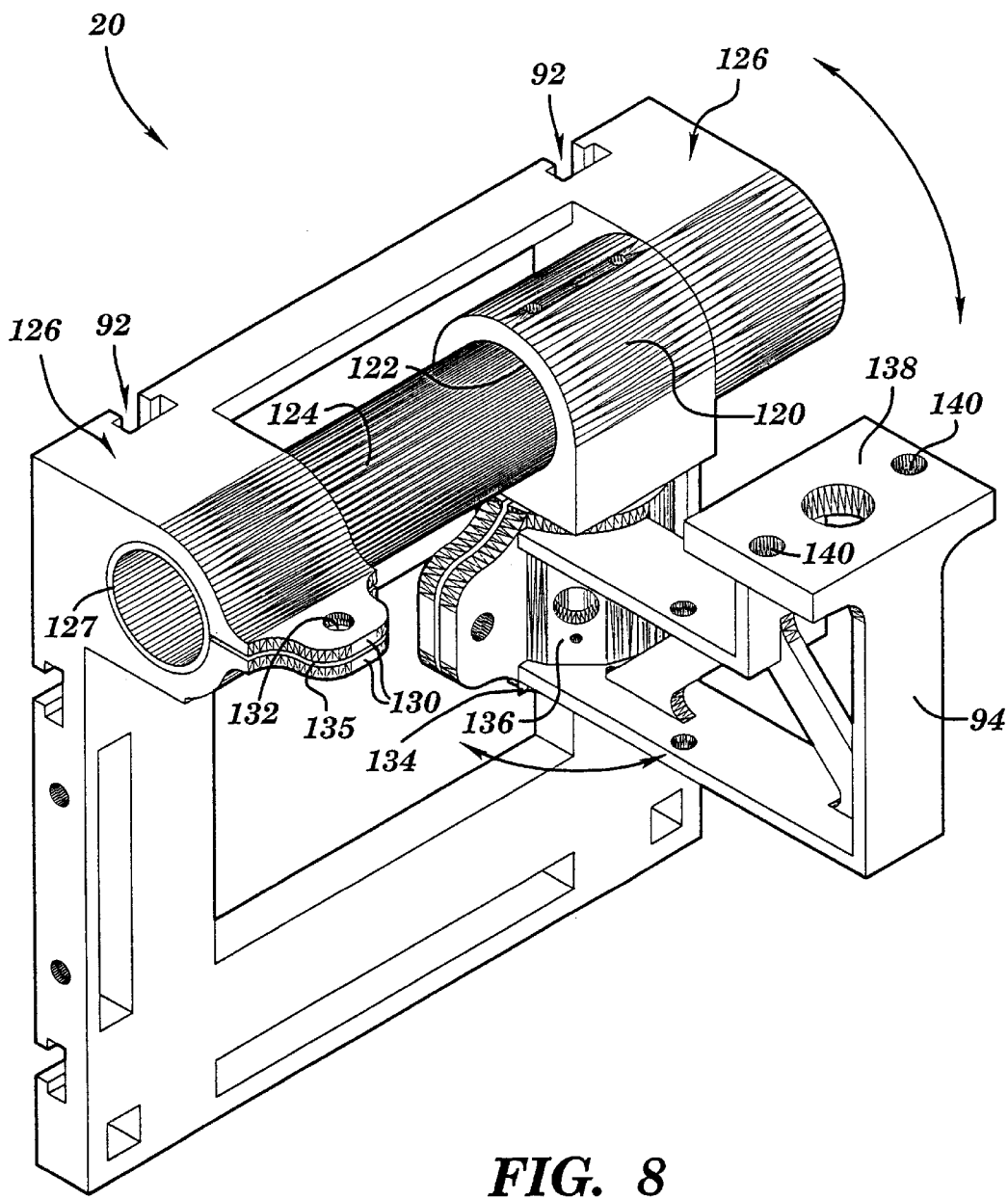
FIG. 8 is an isometric view of the backside of a second table assembly of the present invention shown detached from the other components of the multiple-axis machining apparatus.

In reference now to FIG. 8, second table assembly 20 is shown detached from the other components of the multiple-axis machining apparatus 10. As can be seen from the backside, second table assembly 20 may include a mounting bracket 94 which is used to removably mount second table assembly 20 to the underside of first table 12, the details of which will be described hereinafter.

Second table assembly 20 may include a housing member 120 protruding therefrom. Housing member 120 has a cylindrical cavity 122 formed therethrough for the insertion of a first cylindrical tube 124 therein. Housing member 120 may have a central axis which is parallel to the plane of work surface 90. Preferably, first cylindrical tube 124 is rigidly secured within cylindrical cavity 122. Housing member 120 may be flanked on both sides by clamps 126. A cylindrical bore 127 may be formed through each clamp 126 for insertion of first cylindrical tube 124 therein. The central axes of clamps 126 and housing member 120 are preferably co-axial.

Each clamp 126 comprises two curved members 128, inwardly formed, which level off to form corresponding flat ledges 130. A gap 135 may separate corresponding ledges 130. An opening 132 is formed through each flat ledge 130. Both openings 132 are aligned to one another so that conventional mechanical fasteners may be used to secure clamps 126 to cylindrical tube 124. Therefore, corresponding flat ledges 130 may be compressed so as to close or decrease gap 135. By this configuration, it is intended that second table assembly 20 may be rotated about the longitudinal central axis of tube 124. Once work surface 90 is rotated to a specific desired location, fasteners may be employed to tightly secure clamps 126 so that work surface 90 is rigidly positioned for machining operations.

A second cylindrical tube 134 may be attached or formed integral to housing member 120, extending in a direction perpendicular to the longitudinal axis of first cylindrical tube 124. An associated clamp 136 may rotatably embrace second cylindrical tube 134. Clamp 136 may be of similar construction to clamps 126. On one side of clamp 136, mounting bracket 94 extends therefrom. Mounting bracket 94 may resemble an L-shaped member, terminating in a connection pad 138. Connection pad 138 includes a plurality of holes for mechanically securing second table assembly 20 to the underside of first table 12. Second table assembly 20 may be rotated about the longitudinal axis of second cylindrical tube 134. Once table assembly 20 is rotated to a desired location, fasteners may be employed to rigidly secure table assembly 20 in the desired position.

In reference now to FIG. 12, the underside of first table 12 may include an elongated slot 142 extending in a direction parallel to second axis 42. Elongated slot 142 preferably is a T-slot similar to the other T-slots disclosed hereinabove. An insert 144 may be slidably inserted into slot 142. Insert 144 can include mechanical means for fastening connection pad 138 of mounting bracket 94 thereto. Once connection pad 138 is attached to insert 144, second table assembly 20 may be slidably moved in the X-direction. Once second table assembly 20 is positioned at a desired location, mounting bracket 94 may be securely tightened to table 12.

Figure 9:
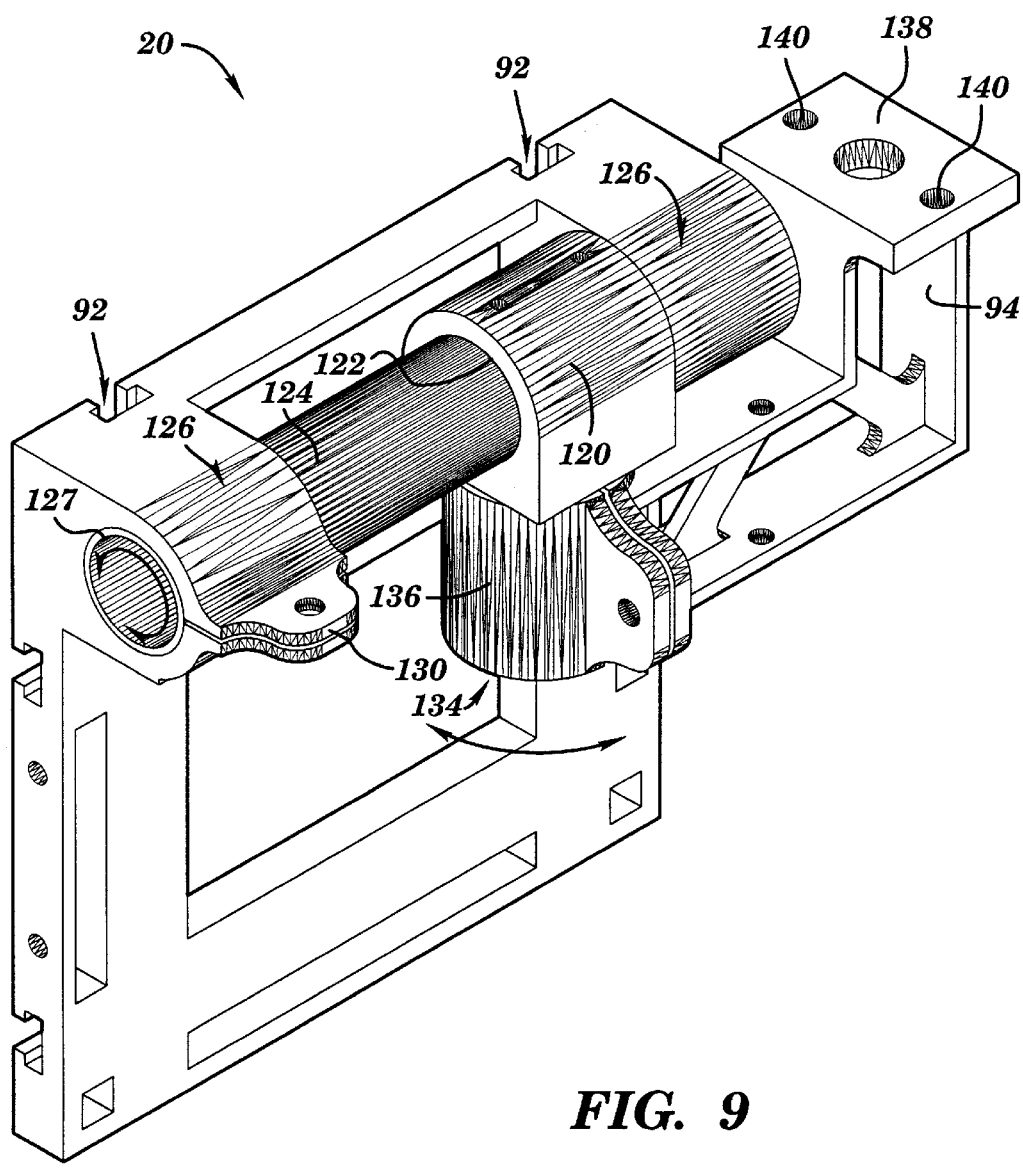
FIG. 9 is another isometric backside view of the second table assembly which, in conjunction with FIG. 8, depicts the Z-axis rotation of the second table assembly.
Figure 9A:
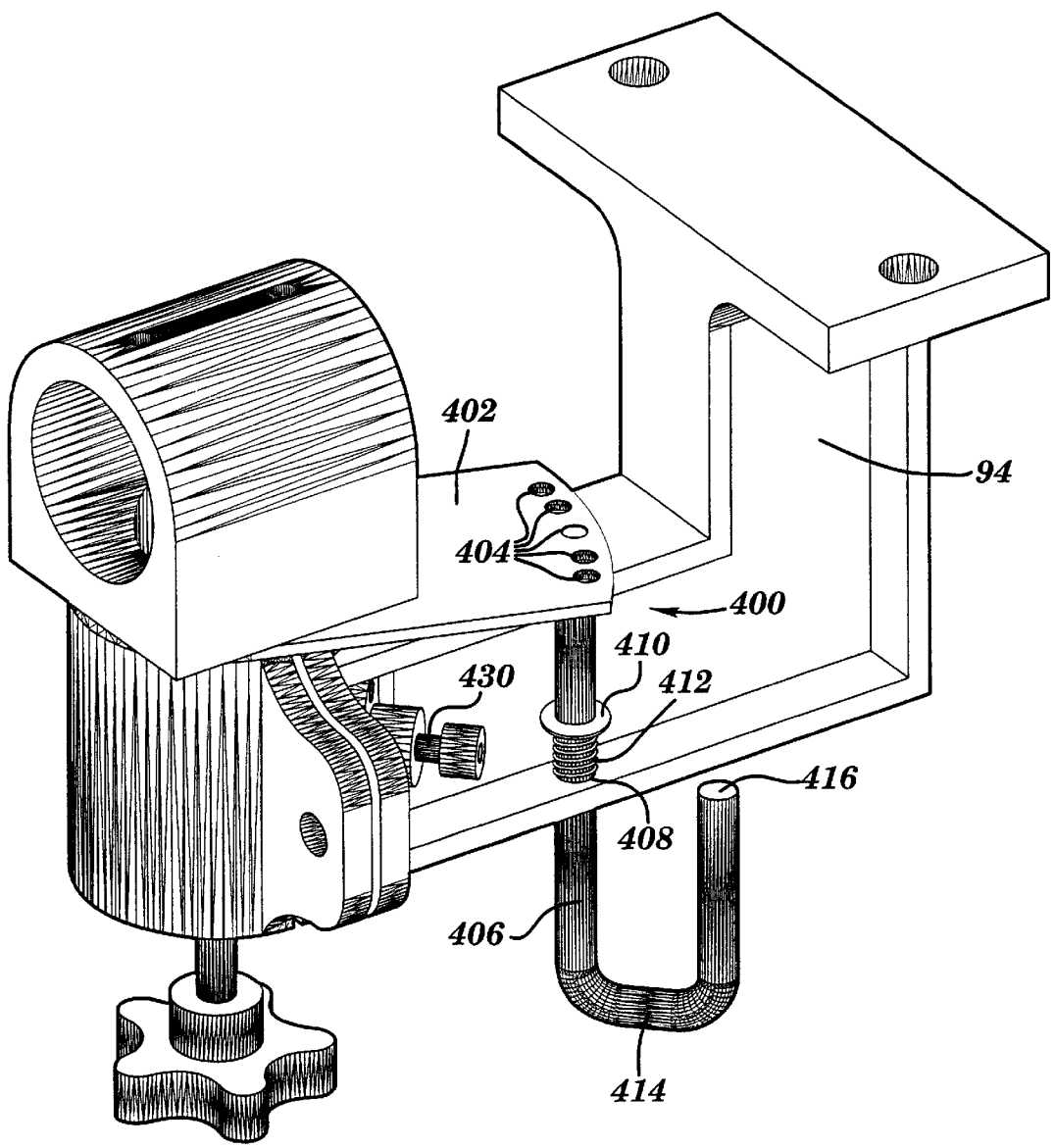
FIG. 9A is an isometric view of an indexing assembly constructed in accordance with the principles of the present invention.
Figure 9B:
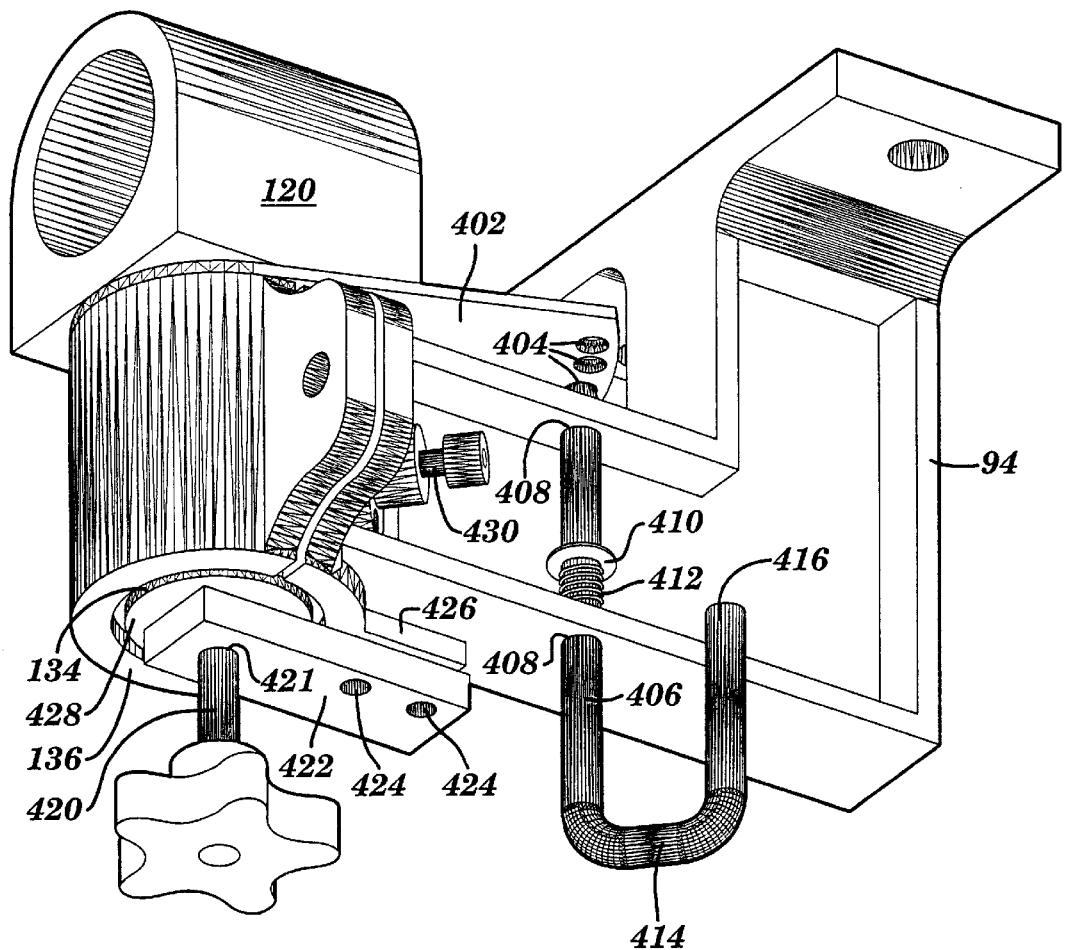
FIG. 9B is another isometric view of the indexing assembly shown in FIG. 9A.

In reference now to FIGS. 9A & 9B, second table assembly 20 may include means, i.e., a positioner, for precisely and accurately positioning table 90 in any position about an axis parallel to the Z-axis. Such a function is desired so as to facilitate the ease in effecting operations such as dovetailing. As illustrated in the drawings, the precise and accurate positioning of second table 90 about the Z-axis may be accomplished through the provision of an indexing assembly 400. Indexing assembly 400 may include an indexing plate 402, which is removably fixed to housing member 120. Mechanical securing means, e.g., screws may be employed to removably fix plate 402 to housing member 120. Preferably, indexing plate 402 includes an opening (not shown) which may receive second cylindrical tube 134 (see FIG. 9) therein.

A plurality of apertures 404 may be formed on indexing plate 402, with each aperture 404 representing a specified angle of rotation about the Z-axis for precisely and accurately positioning table 90 thereabout. As shown in FIG. 9A, five apertures 404 are shown, with the center aperture representing a zero angle, and the adjacent apertures representing equal angles in opposing directions. It should be noted that an entire series of removable indexing plates having apertures which represent any angles may be employed in the subject invention. By easily changing plates, any angle may be selected to produce any dovetail. While the most common plates will have apertures which represent the most common dovetailing angles, other plates may have apertures for representing any dovetailing angle.

Indexing assembly 400 may be securely positioned at one of the specified angles provided by plate 404 through the provision of a stop pin 406 which can be employed to engage one of apertures 404 of plate 402. Pin 406 may be received by aligned holes 408 formed in the flanged sections of mounting bracket 94. In order to retain pin 406 in the upright position within one of apertures 404, a retainer ring 410 for holding a coil spring 412 may be formed about the circumference of pin 406. One end of spring 412 may rest against the inner wall of one of the flanged sections of mounting bracket 94 and the other end may rest against ring 410, thereby forcing pin 406 upwards for engagement in one of apertures 404. While the preferred embodiment describes a retainer ring 410 and spring 412 assembly, it should be understood that any other mechanical means may be substituted therefor for engaging pin 406 to any of apertures 404.

Both the engaging end of pin 406 and each aperture 404 are preferably tapered for mutual engagement. Pin 406 may curve around at 414 to form a J-hook configuration and terminate in a second end 416. When rotating work surface 90 about the Z-axis, it is necessary to disengage pin 406 from the engaged aperture 404. However, spring 412 forces pin 406 upwards towards plate 402. In order to keep the engaging end of pin 406 from being forced upward, pin 406 may be pulled downward through holes 408 and rotated about the central axis thereof so that second end 416 of pin 406 may be jammed under the bottom of mounting arm 94. When it is time to engage pin 406 to one of the apertures 404, pin 406 may be easily rotated to disengage second end 416 of pin 406 from the underside of mounting arm 94.

In reference to FIG. 9B, through the provision of a jack screw 420, table 90 may be raised or lowered vertically in a direction parallel to the Z-axis. As illustrated in FIG. 9B, a rectangularly formed plate 422 may be rigidly secured, through conventional mechanical fasteners 424, to an extension member 426 projecting laterally away from clamp 136. A threaded hole 426, adapted to receive screw 420, passes through plate 422. During operation, one end of screw 420 engages the lower end of second cylindrical tube 134. By rotating screw 420, tube 134 may be lowered or raised, thereby translating vertical displacement to housing member 120, in turn advancing work surface 90 in the Z-direction. Jack screw 420 presents a highly controllable way to change the elevation of work surface 90, thereby permitting the coplanar presentation of work surface 90 with the other table surfaces of the subject invention. It should be understood that the subject invention is not limited to a jack screw as described above, and any mechanical means for raising and lowering table 90 may be substituted therefor.

A stop pin 430 may act to variably lock second cylindrical tube 134 in a plurality of the most commonly used angles, e.g., the 0, 45 and 90 degree positions. Therefore, work surface 90 may be rotated about the Z-axis and easily locked into any one of these common positions. A plurality of vertical slots may formed in cylindrical tube 134 so as to receive a tapered end of stop pin 430. Each vertical slot formed in 134 represents and angular position. Preferably, stop pin 430 is spring loaded and includes a detente for keeping stop pin 430 from engaging one of the vertical slots.

FIGS. 10 and 11 illustrate the adjustable positioning of table assembly 20 in relation to first table 12. By rotating table assembly 20 about tubes 124 and 134, table 90 of table assembly 20 may be presented in virtually any angular position in three dimensions. Typically, table assembly 20 may be used principally for end and edge milling of workpieces. FIG. 13 depicts table 90 in a vertical position, with router bit 47 of second router 46 facing downward. Other operations which may be performed with assembly 20 include through-cuts, sliding dovetails, stopped sliding dovetails, stopped and pocket dadoes, stopped and pocket splines, and pocket mortises. It should be understood that by adjusting the position of table assembly 20, all of these cuts may be performed on any facet of a workpiece. Moreover, all cuts may be performed at any angle or on any facet of the workpieces.

As can be seen in FIG. 15, the present invention may be equipped with a removable third table assembly 160. Third table assembly 160 is a moveable table assembly and may be slidably attached to carriage assembly 14, e.g., to guide rod 48, so as to facilitate the precise and repeatable positioning of a workpiece attached to third table assembly 160 in relation to tool bit 27 of router 26. By attaching third table assembly 160 to guide rod 48, extremely precise movement of assembly 160 in the X and Y directions may be achieved.

Figure 16:
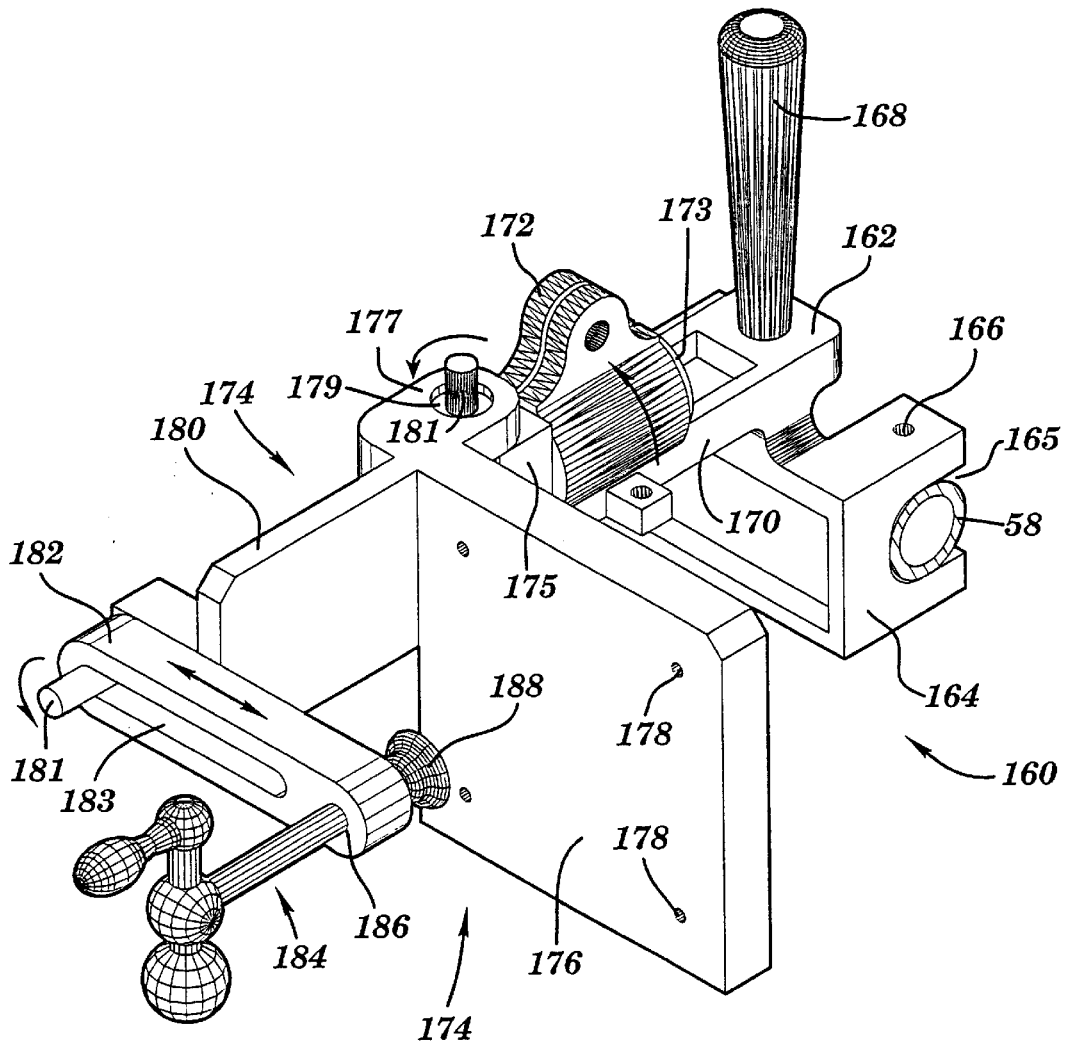
FIG. 16 is an isometric view detailing the third table assembly of FIG. 15 as detached from the other components of the multiple-axis machining apparatus.

As seen best in FIG. 16, third table assembly 160 is shown detached from the other components of the multiple-axis machining apparatus 10. Third table assembly 160 may include a support member 162 having two side brackets 164 for attaching assembly 160 to guide bushings 58 of guide rod 48. Each side bracket 164 includes a cylindrically shaped inner wall 165 which corresponds to the cylindrical shape of guide bushings 58. A threaded hole 166 may extend through the top of each side bracket 164 so that assembly 160 may be mechanically secured to bushings 58. A handle 168 extends off support member 162 for an operator to grasp. By pushing and pulling handle 168, the operator can accurately maneuver third table assembly 160 in the X-direction.

A branch 170 may extend off of support member 162 in a direction perpendicular to the longitudinal axis of guide rod 48. The bottom of branch 170 may rest on the upper surface of fence body 78 and slide therealong during X-direction motion. A clamp 172 may be rigidly attached to the top of branch 170. Clamp 172 may be of the same configuration as clamps 126 and 136 of table assembly 20.

A hinge block 175 having a cavity (not shown) extending therethrough may be rigidly secured to one end of a cylindrical tube 173. Cylindrical tube 173 may removably be inserted into clamp 172. A workpiece presentation member 174 may be attached to hinge block 175. Workpiece presentation member 174 may include a pair of flanges 177 flanking the opposed faces of hinge block 175. Each flange 177 includes a hole 179 which may be aligned concentric with the cavity of hinge block 175. A hinge pin 181 may be inserted through the cavity of hinge block 175 and through holes 179 of flanges 177 of presentation member 174. By this configuration, presentation member 174 may be rotated about the hinge pin 181. Standard fastening means may be employed to lock presentation member 174 in a desired position.

Workpiece presentation member 174 may also include a workpiece face 176, which may include a plurality of holes 178 to facilitate attachment of a workpiece backing board (not shown). An extension bar 180 may extend perpendicular to workpiece face 176. A member 182 having an elongated slot 183 formed through the length thereof may be attached to extension bar 180. A pivot pin 181 may be attached to extension bar 180 so as to facilitate the rotation of member 182 about pivot pin 181. The structure of slotted member 182 also facilitates the movement thereof in a direction which is parallel to workpiece face 176. A T-bar handle assembly 184 may be threadably secured to a threaded hole 186 formed through member 182 so as to facilitate the positioning of clamp 188 in relation to face 176. Standard fasteners (not shown) may be employed to lock slotted member 182 in a desired position.

Figure 17:
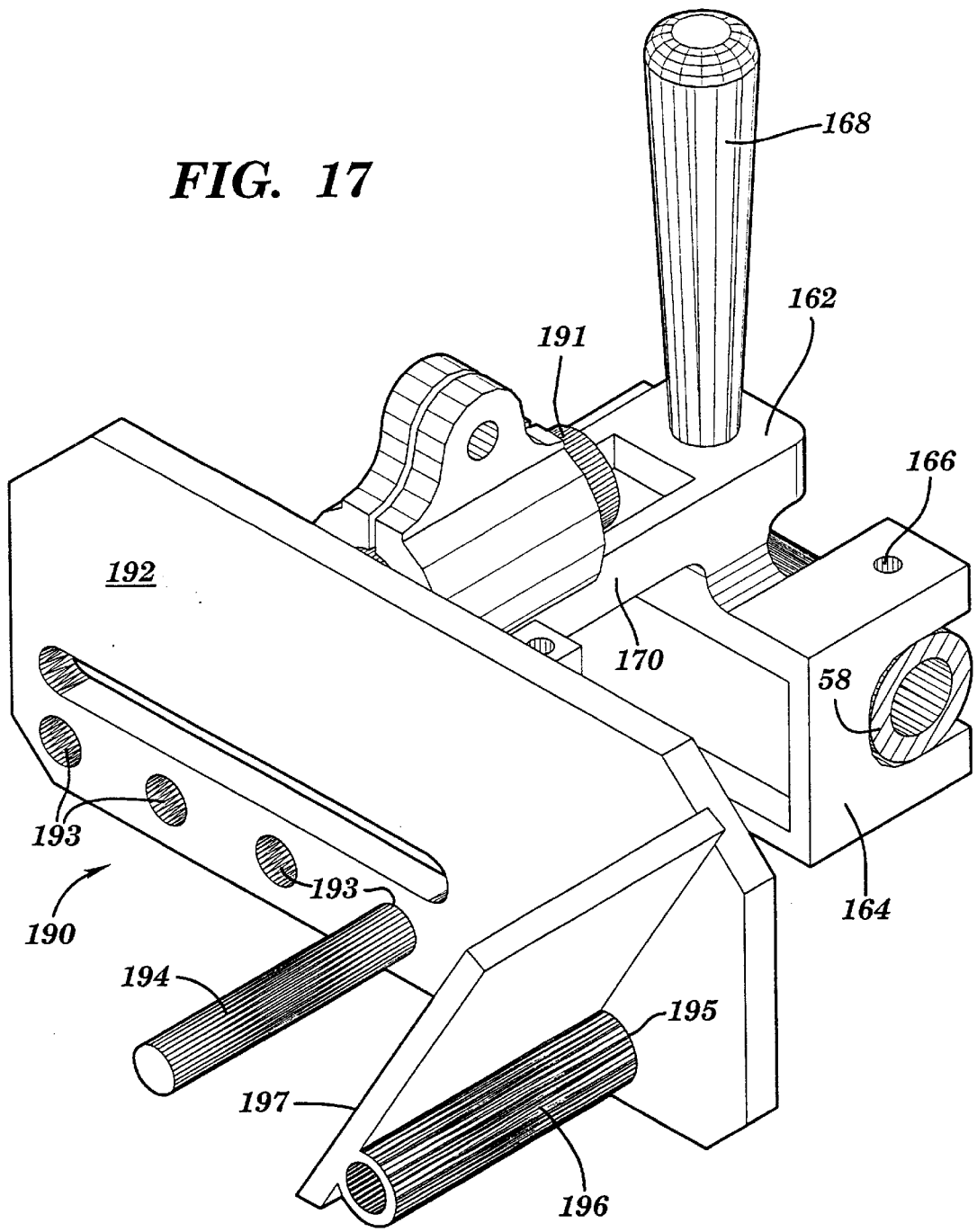
FIG. 17 is an isometric view of a milling table assembly constructed in accordance with the principles of the present invention.

As depicted in FIG. 17, an alternative workpiece presentation member, i.e., a milling table or cradle 190 may be substituted for the workpiece presentation member 174 shown in FIGS. 15 and 16. As can be seen in FIG. 17, most of the elements of third table assembly 160 as described above are intended to be employed with alternative milling cradle 190.

Milling cradle 190 may include a cylindrical tube 191 which extends away from the back of a support plate 192. Tube 192 may be removably inserted into the cavity of clamp 172 and securely fixed therein. Support plate 192 may form a planar surface which may be oriented parallel to the Z-axis. Support plate 192 may include a plurality of apertures 193 for receiving a pin 194. Pin 194 is configured for being removably inserted into each of the plurality of apertures 193. Alternatively, as a means for moving pin 194, an elongated slot (not shown) may be formed in support plate 192. Conventional mechanical fasteners may be employed in removably securing pin 194 to each of the plurality of apertures 193 or to the elongated slot.

Support plate 192 may also include a hole 195 for removably receiving a second pin 196 having a rotating workpiece surface 197 attached thereto. Pin 196 facilitates the rotation of workpiece surface 197 so that plate 197 may be rotated about the longitudinal axis of pin 196 for being selectively fixed into a plurality of positions.

Milling cradle 190 as described herein may be used primarily for effecting vertex through spline cutting. By selectively engaging pin 194 in one of the plurality of apertures 193 and selectively positioning workpiece surface 197, spline cuts may be effected on any workpiece vertex. Because spline cuts require that the vertex of the workpiece be equidistant, milling cradle 190 enables vertex through spline cuts to be performed not only on the most commonly formed workpiece vertexes, but on virtually any workpiece vertex.

Figure 18:
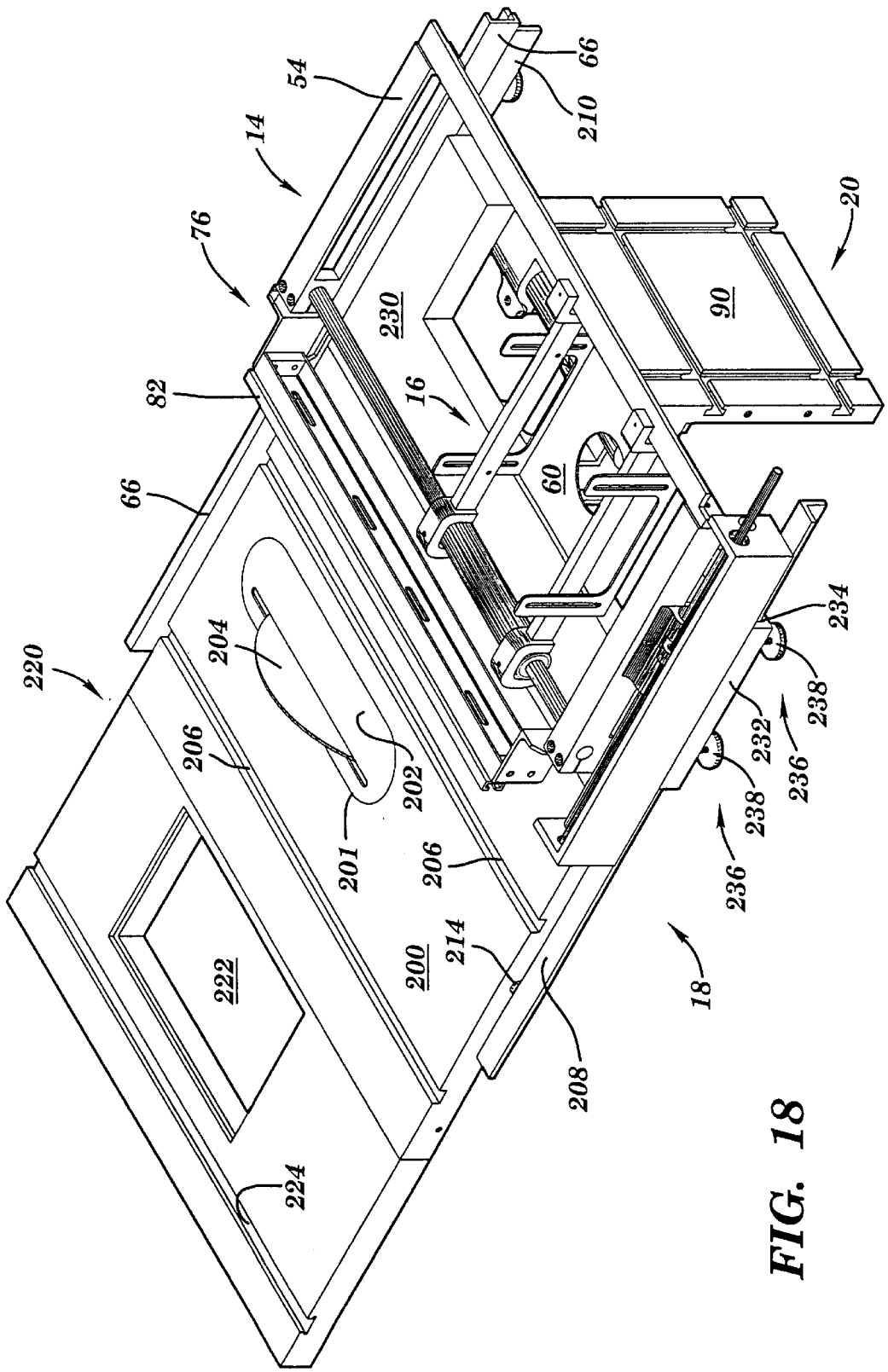
FIG. 18 is an isometric view of a conventional saw table having two extension tables attached thereto, in combination with the carriage assembly, the positioner assembly, and the second table assembly of the present invention.

In another embodiment of the present invention, the components of the subject invention may be used in conjunction with an ordinary table saw main table 200. More specifically, as shown in FIG. 18, a conventional saw table 200 may be used in conjunction, for example, with carriage assembly 14, positioner assembly 18 and second table assembly 20.

An ordinary table saw table 200 may include an aperture 201 for accommodating a platen 202 and a saw blade 204. Also, saw table 200 may include one or more T-slots 206 for attaching work pieces or other attachment devices and tools thereto. Saw table 200 may also include a pair of supports, e.g., angle supports 208 and 210, both of which are removably attached to the sides of main table 200 by known mechanical fasteners, e.g., threaded bolts 214, adapted to be engaged to an associated threaded aperture (not shown) in the sides of table 200.

Typically, saw table 200 can removably accommodate extension tables for lengthening the work surface of table 200. Preferably, these extension tables will be co-planar with table 200. Accordingly, on both ends of main table 200, a first extension table 220 and a second extension table 230 may be removably attached thereto. Both first and second table extensions 220, 230 may be removably attached to table 200 by any known means, e.g., through-bolts (not shown).

First extension table 220 may be configured in the same manner as first table 12. Therefore, first extension table 220 may have an opening 222 for mounting a tool therein and one or more T-slots 224 for attaching work pieces and other accessories thereto. Second table 230 may include two laterally disposed wing portions which form a cutaway region therebetween. The cutaway region enables the utilization of second table assembly 20, as described above, and illustrated in FIGS. 8–9.

Support 208 may be employed to removably and adjustably secure carriage assembly 14 to main table 200. Through the provision of a clamping member, e.g., a C-shaped block 232, first support 208 may be removably secured to the underside of positioner assembly 18. Preferably, C-shaped block 232 represents an elongated member having a channel 234 extending the length thereof. When viewed from one of its ends, block 232 appears to form a C-shaped configuration. In order to removably secure block 232 to support 208, one or more threaded bolt assemblies 236, and preferably two bolt assemblies 236, may be threaded to an equal number of threaded apertures (not shown) passing through the underside of block 232. Each bolt assembly 236 may include a knob 238 for facilitating ease of rotation when securing block 232 to support 208.

On the opposite side of carriage assembly 14, through the provision of another C-shaped block 232, guide track 66 may be removably secured to support 210. As described above, in order to facilitate movement of carriage assembly 14 in the Y-direction, the underside of second transverse support rod 54 of carriage assembly 14 may slidably ride on the upper surface of guide track 66.

By utilizing the elements of positioner assembly 18, carriage assembly 14 may be precisely moved in the Y-direction. However, if lead screw 72 does not provide adequate displacement of carriage assembly 14 in the Y-direction, positioner assembly 18 and attached carriage assembly 14 may also be manually moved by loosening bolt assemblies 236 of block 232 and then relocating assemblies 14 and 18 in the Y-direction. Once the assemblies are positioned at a selected location, C-shaped block 232 may be re-attached to support 208.

The multiple-axis machining apparatus 10 of the present invention may be employed to perform virtually an endless number of router and other tooling operations on a workpiece. For example, first table 12, second table assembly 20, third table assembly 160, and milling cradle 190 provide for numerous work surfaces to which a work piece may be attached. Each of the work surfaces associated with these tables presents a different type of machining operation. All tables present work surfaces for effecting highly precise and repeatable machining operations.

Operationally, a workpiece may be positioned on upper surface 22 of first table 12. The workpiece may be propped up against fence structure 76 so as to rigidly support the workpiece in relation to router bit 27 of first tool 26. T-slot 82 may be used to secure the workpiece to fence structure 76. By rotating hand wheel 74 of positioner assembly 18, the fence structure 76 may be precisely and repeatably positioned in the Y-direction in relation to the upper surface of first table 12. Therefore, the workpiece may be positioned in relation to bit 27 so that machining operations may be accurately and repeatably performed thereon. All lengthwise and width-wise through cuts may be performed on the workpiece with table 12. For example, length-wise cuts include decorative edge milling and shaping, panel raising, splining, face milling, end laps, stile and rail joints, may all be performed on the workpiece. Width-wise through cuts may include, for example, dadoes, dovetail dadoes, tenons, and panel end cuts. Numerous other operations may also be performed by utilizing first table 12.

Alternatively, the second table assembly 20 may be employed to perform various machining operations on a workpiece. A workpiece may be secured to work surface 90 of table assembly 20, for example, by utilizing T slots 92. By rotating tubes 124 and 134, work surface 90, and therefore the workpiece, may be positioned in any desired plane. Once a desired position is selected, table assembly 20 may be locked in position. Also, indexing assembly 400 further facilitates workpiece presentation. The x-axis carriage positioner 300 further facilitates presentation of a workpiece tool. Moreover, table assembly 20 may be slidably engaged within slot 142 of first table 12. Therefore, table assembly 20 may be selectively positioned in relation to table 12 in the X-direction.

Router 46, mounted in carriage 16, and having router bit 47 protruding downward through opening 61, may be employed to perform various machining operations on the workpiece secured to work surface 90. As described hereinabove, router 46 may be selectively positioned in the X-direction along elongated members 48 and 50. Furthermore, support plate 60 of carriage 16 may be raised and lowered for performing various router operations on the workpiece. If a plunge router is employed, a greater vertical displacement may be achieved. Also, jack screw 420 facilitates vertical Z-direction displacement of work surface 90. Typically, the second table assembly 20 is employed to make through-type cuts, including stopped, spline and pocket cuts. As stated hereinabove, all cuts can be performed on any facet of the workpiece and at any angle of the selected facet. As one can imagine, numerous other operations may also be performed with second table assembly 20.

The third table assembly 160, including milling cradle 190, may be employed to perform various machining operations on a workpiece. Third table assembly 160 may be removably attached to guide rod 48 so as to facilitate precise X-direction movement of table assembly 160. Typically, carriage 16 is removed from carriage assembly 14 to accommodate third table assembly 160. The slotted member may be adjustably positioned, and in conjunction with T-bar assembly 184, a workpiece may be attached to face 176. By rotating workpiece presentation member 174 about pin 181 and tube 173, the workpiece may be presented, in relation to tool bit 27, in virtually any plane. Once the desired position is selected, the third table assembly 160 may be locked into position, and various machining operations may be performed on the workpiece. Typically, the third table assembly is used to make width-wise and thickness-wise through cuts on workpiece ends. Alternatively, workpiece presentation member 174 may be removed and milling cradle 190 be employed with the other elements at table assembly 160 for even greater versatility in machining operations. For example, workpiece presentation member 174 and milling cradle 190 may be used in an entire array of machining operations to effect an entire array of width-wise or thickness-wise cuts, including dovetail joints, box joints, angled box joints, end splines, tenons and angled tenons, lap joints, bridle joints, and stile and rail joints.

While several aspects of the present invention have been described and depicted herein, alternative aspects may be effected by those skilled in the art to accomplish the same objectives. For example, while the presently preferred embodiments of the invention are directed to router tool, the structure of the present invention may accommodate numerous other tools, such as portable saws and motorized tool bit spindles. Accordingly, it is intended by the appended claims to cover all such alternative aspects as fall within the true spirit and scope of the invention.

What is claimed:

1. A multiple-axis machining apparatus, comprising:
   a main table forming an upper surface and having an opening for mounting a first tool therein, wherein said upper surface has coplanar first and second axes intersecting each other in perpendicular relationship, said opening being centered on a third axis intersecting said first and second axes in perpendicular relationship;
   a carriage assembly operatively engaged to said main table for moving said carriage assembly in a direction parallel to said second axis; and
   a carriage operatively engaged to said carriage assembly for moving said carriage in a direction parallel to said first axis, said carriage constructed for holding a second tool therein and projecting a bit downward.

2. The multiple-axis machining apparatus of claim 1, further comprising a positioner for selectively positioning said carriage in a direction parallel to said first axis.

3. The multiple-axis machining apparatus of claim 2, wherein said positioner comprises:
   a first member attachable to said carriage assembly;
   a second member attachable to said carriage;
   a lead screw extending in a direction parallel to said first axis;
   a nut threadably engageable to said lead screw;
   said nut being attached to said second member such that when said nut is moved on said lead screw, said movement translates to said carriage so that said carriage is moved in a direction parallel to said first axis.

4. The multiple-axis machining apparatus of claim 3, further comprising a fence attached to said carriage assembly, said first member of said positioner being attachable to said fence.

5. The multiple-axis machining apparatus of claim 1, further comprising a positioner for selectively positioning said carriage assembly in a direction parallel to said second axis.

6. The multiple-axis machining apparatus of claim 5, wherein said positioner comprises:
   a lead screw extending in a direction parallel to said second axis;
   a nut threaded to said lead screw;
   means for securing said nut to said carriage assembly such that when said nut is moved on said lead screw, said movement translates to said carriage assembly, thereby moving said carriage assembly in a direction parallel to said second axis.

7. The multiple-axis machining apparatus of claim 1, further comprising a second table, said second table attachable to said main table and disposed in a lower position relative to said carriage.

8. The multiple-axis machining apparatus of claim 7, further comprising means for rotating said second table about an axis parallel to said third axis.

9. The multiple-axis machining apparatus of claim 7, further comprising means for rotating said second table about an axis perpendicular to said third axis.

10. The multiple-axis machining apparatus of claim 9, wherein said carriage includes a support plate having a hole formed therein for projecting a bit of a second tool downward therethrough, said carriage and said second table being positionable relative to one another.

11. The multiple-axis machining apparatus of claim 1, further comprising means for presenting a vertex of a workpiece to a first bit of said first tool.

12. The multiple-axis machining apparatus of claim 1, wherein said vertex presenting means is adapted for adjustably accommodating a plurality of vertexes, wherein each vertex is formed at a different angle.

13. A multiple-axis machining apparatus, comprising:
   a rigid surface having coplanar first and second axes intersecting one another in perpendicular relationship, and a third axis intersecting said first and second axes in perpendicular relationship;
   a carriage assembly attachable to said rigid surface, said carriage assembly being moveable in a direction parallel to said second axis;
   a carriage operatively engaged to said carriage assembly for moving said carriage in a direction parallel to said first axis, said carriage constructed for holding a tool and projecting a bit thereof downwardly; and
   a second table operatively engaged to said rigid surface, said second table being disposed below said carriage assembly.

14. The apparatus of claim 13, wherein second table is rotatable about an axis parallel to said third axis.

15. The apparatus of claim 14, further comprising a positioner for selectively positioning and securing said second table in a plurality of positions about an axis parallel to said third axis.

16. The apparatus of claim 15, further comprising means for raising and lowering second table in a direction parallel to said third axis.

17. A multiple-axis machining apparatus for use with a saw table, said saw table forming an upper surface and having an opening for projecting a saw blade through said opening and above said upper surface, wherein said upper surface has coplanar first and second axes intersecting one another in perpendicular relationship, and a third axis intersecting said first and second axes in perpendicular relationship, said apparatus comprising:

a carriage assembly adapted to be engageable to said saw table, said carriage assembly being moveable in a direction parallel to said second axis; and a carriage operatively engageable to said carriage assembly for moving said carriage in a direction parallel to said first axis, said carriage constructed for holding a tool therein for projecting a bit downward.

18. The multiple-axis machining apparatus of claim 17, further comprising:

at least one extension table attachable to said saw table.

19. The multiple-axis machining apparatus of claim 17, further comprising:

a second table operatively engageable to said saw table, said second table being disposed below said carriage assembly.

20. The multiple-axis machining apparatus of claim 19, further comprising:

means for rotating said second table about an axis parallel to said third axis.

21. The apparatus of claim 20, further comprising a positioner for selectively positioning and securing said second table in a plurality of positions about an axis parallel to said third axis.

22. The multiple-axis machining apparatus of claim 19, further comprising:

means for raising and lowering said second table in a direction parallel to said third axis.

* * * * *